US012632552B2

(12) United States Patent
Kim et al.

(10) Patent No.: US 12,632,552 B2
(45) Date of Patent: May 19, 2026

(54) SEMICONDUCTOR MEMORY DEVICE AND MEMORY SYSTEM INCLUDING THE SAME

(71) Applicant: SAMSUNG ELECTRONICS CO., LTD., Suwon-si (KR)

(72) Inventors: Dongha Kim, Suwon-si (KR); Seungki Hong, Suwon-si (KR); Youngjae Park, Suwon-si (KR); Dohan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 18/534,135

(22) Filed: Dec. 8, 2023

(65) Prior Publication Data

US 2025/0013746 A1     Jan. 9, 2025

(30) Foreign Application Priority Data

Jul. 7, 2023     (KR) ........................ 10-2023-0088262

(51) Int. Cl.
G06F 21/56          (2013.01)
G06F 11/10          (2006.01)

(52) U.S. Cl.
CPC ........ G06F 21/566 (2013.01); G06F 11/1044 (2013.01); G06F 11/106 (2013.01); G06F 2221/034 (2013.01)

(58) Field of Classification Search
CPC ...... G06F 12/00; G06F 21/566; G06F 11/106; G06F 11/1044; G11C 11/406; G11C 11/4078; G11C 11/40618
USPC ......................................... 714/754, E11.052
See application file for complete search history.

(56) References Cited

U.S. PATENT DOCUMENTS

| | | | |
|---|---|---|---|
| 10,572,341 B2 | 2/2020 | Kwon et al. | |
| 10,817,371 B2 | 10/2020 | Rooney et al. | |
| 10,825,534 B2 | 11/2020 | Nale | |
| 11,056,167 B2 * | 7/2021 | Ito ..................... | G11C 11/40611 |
| 11,221,913 B2 * | 1/2022 | Rooney .............. | G06F 11/1068 |

(Continued)

FOREIGN PATENT DOCUMENTS

CN          115421948 A     12/2022

OTHER PUBLICATIONS

European Extended Search Report issued Jun. 11, 2024 by the European Patent Office for EP Patent Application No. 23220745.6.

*Primary Examiner* — Shelly A Chase
*Assistant Examiner* — Grace V Braden
(74) *Attorney, Agent, or Firm* — Sughrue Mion, PLLC

(57)     ABSTRACT

A semiconductor memory device includes a memory cell array, an error correction code (ECC) engine, an error check and scrub (ECS) circuit, a row hammer management circuit and a refresh control circuit. The ECC engine generates an error generation signal based on a result of an ECC decoding. The ECS circuit generates scrubbing addresses and outputs at least one of the scrubbing addresses as an error address based on the error generation signal. The row hammer management circuit stores an error flag with a first logic level in count cells, compares counted values with different reference number of times based on a logic level of the error flag and outputs a hammer address. The refresh control circuit receives the hammer address and performs a hammer refresh operation on one or more victim memory cell rows which are physically adjacent to the memory cell row corresponding to the hammer address.

20 Claims, 37 Drawing Sheets

(56) References Cited

U.S. PATENT DOCUMENTS

| | | | | |
|---|---|---|---|---|
| 11,249,843 | B2 | 2/2022 | Song | |
| 12,032,439 | B2 * | 7/2024 | Lee | G11C 29/42 |
| 12,217,824 | B2 * | 2/2025 | Gieske | G11C 7/24 |
| 12,315,553 | B2 * | 5/2025 | Gieske | G11C 11/40603 |
| 12,360,847 | B2 * | 7/2025 | Bains | G11C 29/44 |
| 2019/0087127 | A1 * | 3/2019 | Kim | G06F 3/0659 |
| 2022/0121398 | A1 | 4/2022 | Nale et al. | |
| 2022/0139482 | A1 | 5/2022 | Kim et al. | |
| 2022/0208293 | A1 | 6/2022 | Kim et al. | |
| 2023/0021622 | A1 | 1/2023 | Cho et al. | |
| 2023/0161665 | A1 * | 5/2023 | Choi | G06F 11/106 |
| | | | | 714/6.1 |
| 2023/0185460 | A1 | 6/2023 | Kim et al. | |
| 2024/0427497 | A1 * | 12/2024 | Lu | G06F 3/0659 |
| 2024/0428846 | A1 * | 12/2024 | Ayyapureddi | G11C 11/408 |

* cited by examiner

Figures 11C, 11D:
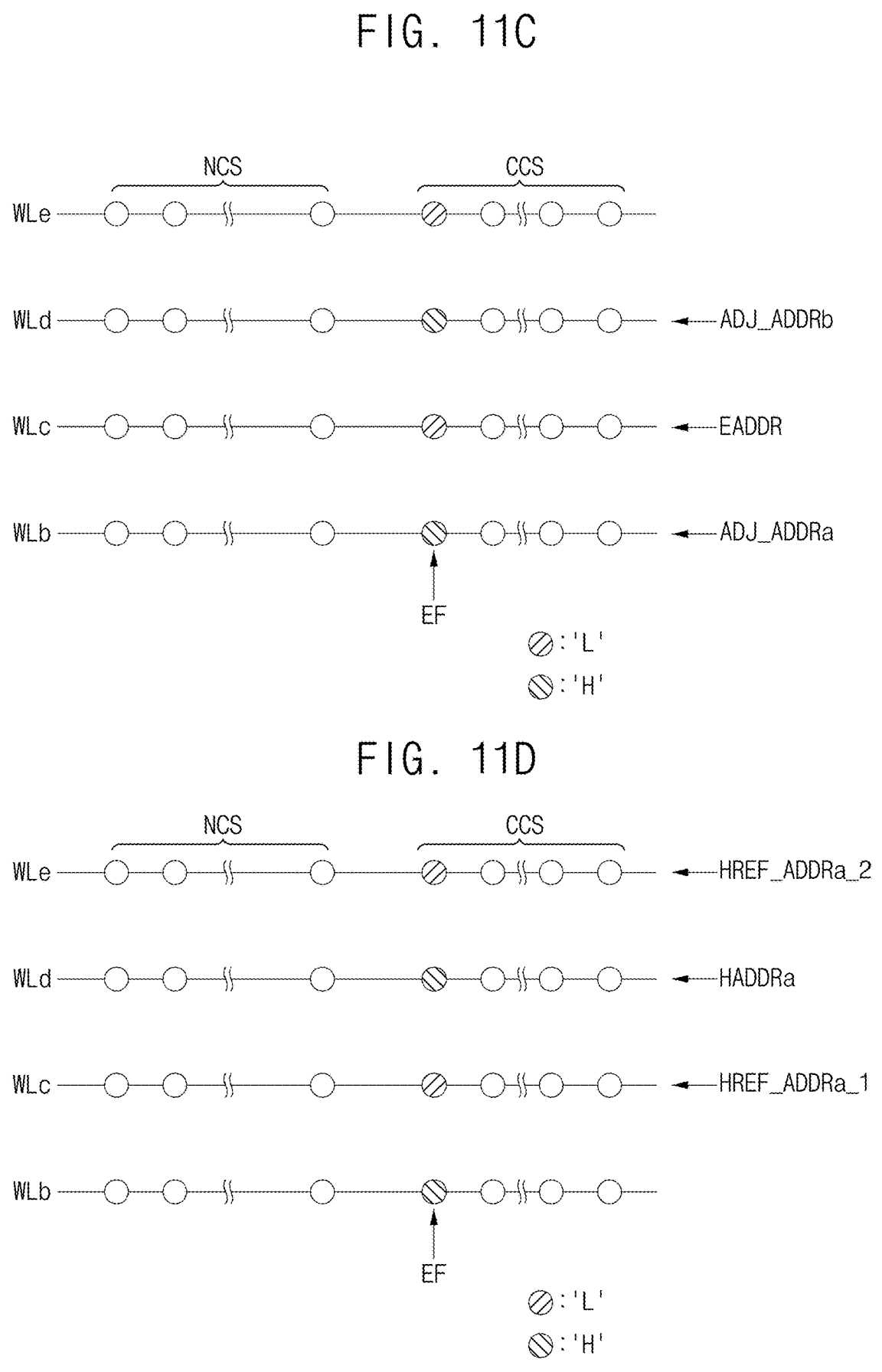

NCS                    CCS

WLe ——○——○—〴—○———⊘——○—〴—○——○—

WLd ——○——○—〴—○———⊘——○—〴—○——○— ←——ADJ_ADDRb

WLc ——○——○—〴—○———⊘——○—〴—○——○— ←——EADDR

WLb ——○——○—〴—○———⊘——○—〴—○——○— ←——ADJ_ADDRa
                          ↑
                         EF

NCS                    CCS

WLe ——○——○—〴—○———⊘——○—〴—○——○— ←——HREF_ADDRa_2

WLd ——○——○—〴—○———⊘——○—〴—○——○— ←——HADDRa

WLc ——○——○—〴—○———⊘——○—〴—○——○— ←——HREF_ADDRa_1

WLb ——○——○—〴—○———⊘——○—〴—○——○—
                          ↑
                         EF

⊘:'L'

⊘:'H'

<u>310aa</u>

| 313a | 311a | 315a | 312a | 314a |
|------|------|------|------|------|
| SCA12 ··· | SCA11 | SCA2 | SCA11 ··· | SCA12 |
| CSLs | CSLs | CSLs | CSLs | CSLs |
| LIO1<1:a> | LIO1<1:a> | LIO2<1:b> | LIO1<1:a> | LIO1<1:a> |
| SCA12 ··· | SCA11 | SCA2 | SCA11 ··· | SCA12 |
| CSLs | CSLs | CSLs | CSLs | CSLs |
| LIO1<1:a> | LIO1<1:a> | LIO2<1:b> | LIO1<1:a> | LIO1<1:a> |
| ⋮ ⋱ | ⋮ | ⋮ | ⋮ ⋱ | ⋮ |
| SCA12 ··· | SCA11 | SCA2 | SCA11 ··· | SCA12 |
| CSLs | CSLs | CSLs | CSLs | CSLs |
| LIO1<1:a> | LIO1<1:a> | LIO2<1:b> | LIO1<1:a> | LIO1<1:a> |
| GIO1<1:a> | GIO1<1:a> | GIO2<1:b> | GIO1<1:a> | GIO1<1:a> |
| IOSA DRV | IOSA DRV | IOSA DRV | IOSA DRV | IOSA DRV |
| 331 341 | 332 342 | 336 346 | 333 343 | 334 344 |

| CMD | CS_n | CA0 | CA1 | CA2 | CA3 | CA4 | CA5 | CA6 | CA7 | CA8 | CA9 | CA10 | CA11 | CA12 | CA13 |
|---|---|---|---|---|---|---|---|---|---|---|---|---|---|---|---|
| ACT | L | L | L | R0 | R1 | R2 | R3 | BA0 | BA1 | BG0 | BG1 | BG2 | CID0 | CID1 | CID2 |
|  | H | R4 | R5 | R6 | R7 | R8 | R9 | R10 | R11 | R12 | R13 | R14 | R15 | R16 | CID3/ R17 |
| WR | L | H | L | H | H | L | BL | BA0 | BA1 | BG0 | BG1 | BG2 | CID0 | CID1 | CID2 |
|  | H | V | C3 | C4 | C5 | C6 | C7 | C8 | C9 | C10 | V | H | L | V | CID3 |
| RD | L | H | L | H | H | H | BL | BA0 | BA1 | BG0 | BG1 | BG2 | CID0 | CID1 | CID2 |
|  | H | C2 | C3 | C4 | C5 | C6 | C7 | C8 | C9 | C10 | V | H | V | V | CID3 |

FIG. 22

| CMD | CS_n | CA0 | CA1 | CA2 | CA3 | CA4 | CA5 | CA6 | CA7 | CA8 | CA9 | CA10 | CA11 | CA12 | CA13 |
|-----|------|-----|-----|-----|-----|-----|------|------|------|------|------|------|------|------|------|
| PREab | L | H | H | L | H | L | CID3 | V | V | V | V | L | CID0 | CID1 | CID2 |
| PREsb | L | H | H | L | H | L | CID3 | BA0 | BA1 | V | V | H | CID0 | CID1 | CID2 |
| PREpb | L | H | H | L | H | h | CID3 | BA0 | BA1 | BG0 | BG1 | BG2 | CID0 | CID1 | CID2 |

WLt-2 ———————————————————— ← HREF_ADDRc

MC    MC    MC

WLt-1 ———————————————————— ← HREF_ADDRa

MC    MC    MC

WLt ———————————————————— ← HADDR

MC    MC    MC

WLt+1 ———————————————————— ← HREF_ADDRb

MC    MC    MC

WLt+2 ———————————————————— ← HREF_ADDRd

MC    MC    MC

BTLg-1      BTLg      BTLg+1

SEMICONDUCTOR MEMORY DEVICE AND MEMORY SYSTEM INCLUDING THE SAME

CROSS-REFERENCE TO RELATED APPLICATIONS

This application claims priority under 35 U.S.C. § 119 to Korean Patent Application No. 10-2023-0088262, filed on Jul. 7, 2023, in the Korean Intellectual Property Office, the disclosure of which is incorporated by reference herein in its entirety.

BACKGROUND

The present disclosure relates to memories, and more particularly to semiconductor memory devices to defend a row hammer attack and memory systems including the same.

A semiconductor memory device may be classified as a volatile memory device or a nonvolatile memory device. A volatile memory device refers to a memory device that loses data stored therein at power-off. As an example of a volatile memory device, a dynamic random-access memory (DRAM) may be used in various devices such as a mobile system, a server, or a graphic device.

In volatile memory devices such as DRAM devices, cell charges stored in a memory cell may be lost by a leakage current. In addition, when a word-line is transitioned frequently between an active state and a precharged state (i.e., when the word-line has been accessed intensively or frequently), an affected memory cell connected to a word-line that is adjacent to the frequently accessed word-line may lose stored charges. Charges stored in a memory cell may be maintained by recharging before data is lost by leakage of cell charges. Such recharge of cell charges is referred to as a refresh operation, and a refresh operation may be performed repeatedly before cell charges are significantly lost.

SUMMARY

Example embodiments may provide a semiconductor memory device capable of defending a row hammer attack by storing hammer address with different reference number of times based on degradation of memory cells.

Further, example embodiments may provide a memory system including a semiconductor memory device capable of defending a row hammer attack by storing hammer address with different reference number of times based on degradation of memory cells.

According to an aspect of an example embodiment, a semiconductor memory device includes: a memory cell array including a plurality of memory cell rows, each of the plurality of memory cell rows includes a plurality of memory cells; an error correction code (ECC) engine configured to perform an ECC decoding on data read from the memory cell array and generate an error generation signal based on the ECC decoding; an error check and scrub (ECS) circuit configured to generate scrubbing addresses for performing a scrubbing operation in an ECS mode and output at least one of the scrubbing addresses as an error address based on the error generation signal; a row hammer management circuit configured to: in the ECS mode, store an error flag with a first logic level in a portion of count cells to store a count data, of each of one or more adjacent memory cell rows which are physically adjacent to a weak memory cell row corresponding to the error address from among the plurality of memory cell rows; and in a normal mode, compare counted values indicating a number of times of access associated with each of the plurality of memory cell rows with different reference number of times based on the error flag to provide a comparison, and output a hammer address designating a first memory cell row, which is intensively accessed, from among the plurality of memory cell rows based on the comparison; and a refresh control circuit configured to receive the hammer address and perform a hammer refresh operation on one or more victim memory cell rows which are physically adjacent to the first memory cell row corresponding to the hammer address.

According to an aspect of an example embodiment, a memory system includes: a semiconductor memory device; and a memory controller configured to control the semiconductor memory device, wherein the semiconductor memory device includes: a memory cell array including a plurality of memory cell rows, each memory cell row of the plurality of memory cell rows including a plurality of memory cells; an error correction code (ECC) engine configured to perform an ECC decoding on data read from the memory cell array and generate an error generation signal based on the ECC decoding; an error check and scrub (ECS) circuit configured to generate scrubbing addresses for performing a scrubbing operation in a scrub mode and output at least one of the scrubbing addresses as an error address based on the error generation signal; a row hammer management circuit configured to: in the ECS mode, store an error flag with a first logic level in a portion of count cells to store a count data, of each of one or more adjacent memory cell rows which are physically adjacent to a weak memory cell row corresponding to the error address from among the plurality of memory cell rows; and in a normal mode, compare counted values indicating a number of times of access associated with each of the plurality of memory cell rows with different reference number of times based on a logic level of the error flag to provide a comparison, and output a hammer address designating a first memory cell row, which is intensively accessed, from among the plurality of memory cell rows based on the comparison; and a refresh control circuit configured to receive the hammer address and perform a hammer refresh operation on one or more victim memory cell rows which are physically adjacent to the first memory cell row corresponding to the hammer address.

According to an aspect of an example embodiment, a semiconductor memory device includes: a memory cell array including a plurality of memory cell rows, each including a plurality of memory cells; an error correction code (ECC) engine configured to perform an ECC decoding on data read from the memory cell array and generate an error generation signal based on the ECC decoding; an error check and scrub (ECS) circuit configured to generate scrubbing addresses for performing a scrubbing operation in a scrub mode and output at least one of the scrubbing addresses as an error address based on the error generation signal; a row hammer management circuit configured to: in the ECS mode, store an error flag with a first logic level in a portion of count cells to store count data, of each of one or more adjacent memory cell rows which are physically adjacent to a weak memory cell row corresponding to the error address from among the plurality of memory cell rows, and in a normal mode, compare counted values indicating a number of times of access associated with each of the plurality of memory cell rows with different reference number of times based on a logic level of the error flag to provide a comparison, and output a hammer address designating a memory cell row, which is intensively accessed, from among the plurality of memory cell rows based on the comparison; and a refresh control circuit configured to receive the hammer address and perform a hammer refresh operation on one or more victim memory cell rows which are physically adjacent to the memory cell row corresponding to the hammer address, wherein the row hammer management circuit is further configured to: receive the error address in the ECS mode, sequentially access a first adjacent memory cell row and a second adjacent memory cell row which are physically adjacent to the weak memory cell row corresponding to the error address, and store the error flag with the first logic level in respective count cells of each of the first adjacent memory cell row and the second adjacent memory cell row.

BRIEF DESCRIPTION OF THE DRAWINGS

Example embodiments of the present disclosure will be described below in more detail with reference to the accompanying drawings, in which:

FIG. 10 illustrates an example of the hammer address queue in the row hammer management circuit of FIG. 9 according to one or more example embodiments;

FIGS. 11B, 11C and 11D illustrate a scrubbing operation and a refresh operation according to example embodiments, respectively;

FIGS. 21 and 22 illustrate example commands which may be used in the memory system of FIG. 1;

DETAILED DESCRIPTION

Various example embodiments of the present disclosure will be described more fully hereinafter with reference to the accompanying drawings, in which example embodiments are shown.

Figure 1:
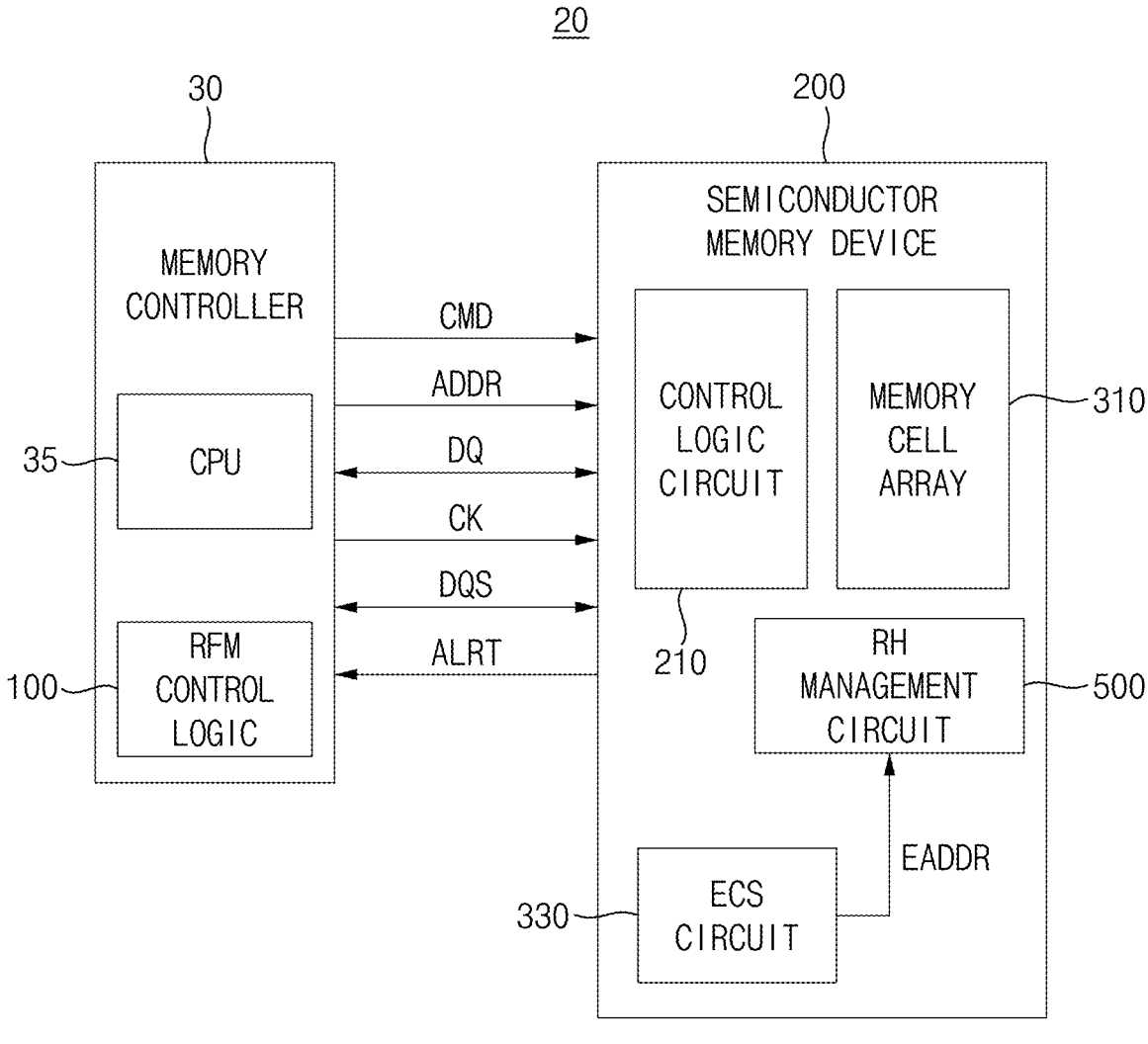
FIG. 1 is a block diagram illustrating a memory system according to one or more example embodiments.

FIG. 1 is a block diagram illustrating a memory system according to one or more example embodiments.

Referring to FIG. 1, a memory system 20 may include a memory controller 30 and a semiconductor memory device 200.

The memory controller 30 may control overall operation of the memory system 20. The memory controller 30 may control overall data exchange between an external host and the semiconductor memory device 200. For example, the memory controller 30 may write data in the semiconductor memory device 200 or read data from the semiconductor memory device 200 in response to request from the host.

In addition, the memory controller 30 may issue operation commands to the semiconductor memory device 200 for controlling the semiconductor memory device 200. In example embodiments, the semiconductor memory device 200 is a memory device including dynamic memory cells such as a dynamic random access memory (DRAM), double data rate 5 (DDR5) synchronous DRAM (SDRAM), a DDR6 SDRAM or the like.

The memory controller 30 may transmit a clock signal CK (the clock signal CK may be referred to a command clock signal), a command CMD, and an address (signal) ADDR to the semiconductor memory device 200. Herein, for convenience of description, the terms of a clock signal CK, a command CMD, and an address ADDR and the terms of clock signals CK, commands CMD, and addresses ADDR may be used interchangeably. The memory controller 30 may transmit a data strobe signal DQS to the semiconductor memory device 200 when the memory controller 30 writes data signal DQ in the semiconductor memory device 200. The semiconductor memory device 200 may transmit a data strobe signal DQS to the memory controller 30 when the memory controller 30 reads data signal DQ from the semiconductor memory device 200. The address ADDR may be accompanied by the command CMD and the address ADDR may be referred to as an access address.

The memory controller 30 may include a central processing unit (CPU) 35 that controls overall operation of the memory controller 30 and a refresh management (RFM) control logic 100 that generates a refresh management command associated with a row hammer of the plurality of memory cell rows of the semiconductor memory device 200.

The semiconductor memory device 200 may include a memory cell array 310 that stores the data signal DQ, a control logic circuit 210, an error check and scrub (ECS) circuit 330 and a row hammer (RH) management circuit 500.

The control logic circuit 210 may control operations of the semiconductor memory device 200. The memory cell array 310 may include a plurality of memory cell rows and each of the memory cell rows may include a plurality of (volatile) memory cells.

The ECS circuit 330, in an ECS mode, may generate scrubbing addresses for performing a scrubbing operation in a scrub mode and output at least one of the scrubbing addresses as an error address EADDR based on a result of the scrubbing operation.

The row hammer management circuit 500 may, in the ECS mode, store an error flag with a first logic level in a portion of count cells to store count data, of each of one or more adjacent memory cell rows which are physically adjacent to a weak memory cell row corresponding to the error address from among the plurality of memory cell rows, and, in a normal mode, may store the count data in the count cells of each of the plurality of memory cell rows by counting a number of times of accesses of each of the memory cell rows based on an active command from the memory controller 30. The row hammer management circuit 500 may, in the normal mode, compare counted values indicating a number of times of access associated with each of the plurality of memory cell rows with different reference number of times based on a logic level of the error flag and output a hammer address designating a memory cell row, which is intensively accessed, from among the plurality of memory cell rows based on a result of the comparison.

In response to a subsequent command such as an active count update command or a precharge command applied after the active command, the row hammer management circuit 500 may perform an internal read-update-write operation, to read the count data from a target memory cell row from among the plurality of memory cell rows, to update the read count data, and to write the updated count data in the target memory cell row.

The row hammer management circuit 500 may perform the internal read-update-write operation based on a flag of a precharge command which is applied after the active command is applied or when a reference time interval elapses from after the active command is applied, and the control logic circuit 210 may precharge the target memory cell row.

The control logic circuit 210 may control access on the memory cell array 310 and may control the ECS circuit 330 and the row hammer management circuit 500.

The semiconductor memory device 200 performs a refresh operation periodically due to charge leakage of memory cells storing data. Due to scale down of the manufacturing process of the semiconductor memory device 200, the storage capacitance of the memory cell is decreased and the refresh period is shortened. The refresh period is further shortened because the entire refresh time is increased as the memory capacity of the semiconductor memory device 200 is increased.

To compensate for degradation of adjacent memory cells due to the intensive access to a particular row or a hammer address, a target row refresh (TRR) scheme was adopted and an in-memory refresh scheme is developed to reduce the burden of the memory controller. The memory controller is totally responsible for the hammer refresh operation in the TRR scheme and the semiconductor memory device is totally responsible for the hammer refresh operation in the in-memory refresh scheme.

The chip size overhead for the in-memory refresh may be serious as the memory capacity is increased and demands on low power consumption of the semiconductor memory device is increased. In addition, the power consumption may be increased because the semiconductor memory device has to care the hammer refresh operation even though there is no intensive access. In addition, a row hammer of a memory cell row selected from the plurality of the memory cell rows is managed.

In the memory system 20 according to one or more example embodiments, while the row hammer management circuit 500 counts each of active numbers associated with the plurality of memory cell rows to store the counted values in the count cells of each of the plurality of memory cell rows as count data and may manage the row hammer of all of the memory cell rows based on the counted values, the semiconductor memory device 200 stores an error flag with a first logic level in the count cells of adjacent memory cell rows which are physically adjacent to a weak memory cell row corresponding to an error address obtained in the scrubbing operation. When the count data of the adjacent memory cell rows is updated, the updated count data of the adjacent memory cell rows is stored in the hammer address queue or address of the adjacent memory cell rows is output as a hammer address by comparing the updated count data with a smaller reference number of time when the error flag has a first logic level. Therefore, the weak memory cell row is refreshed more quickly than normal memory cell rows.

Figure 2:
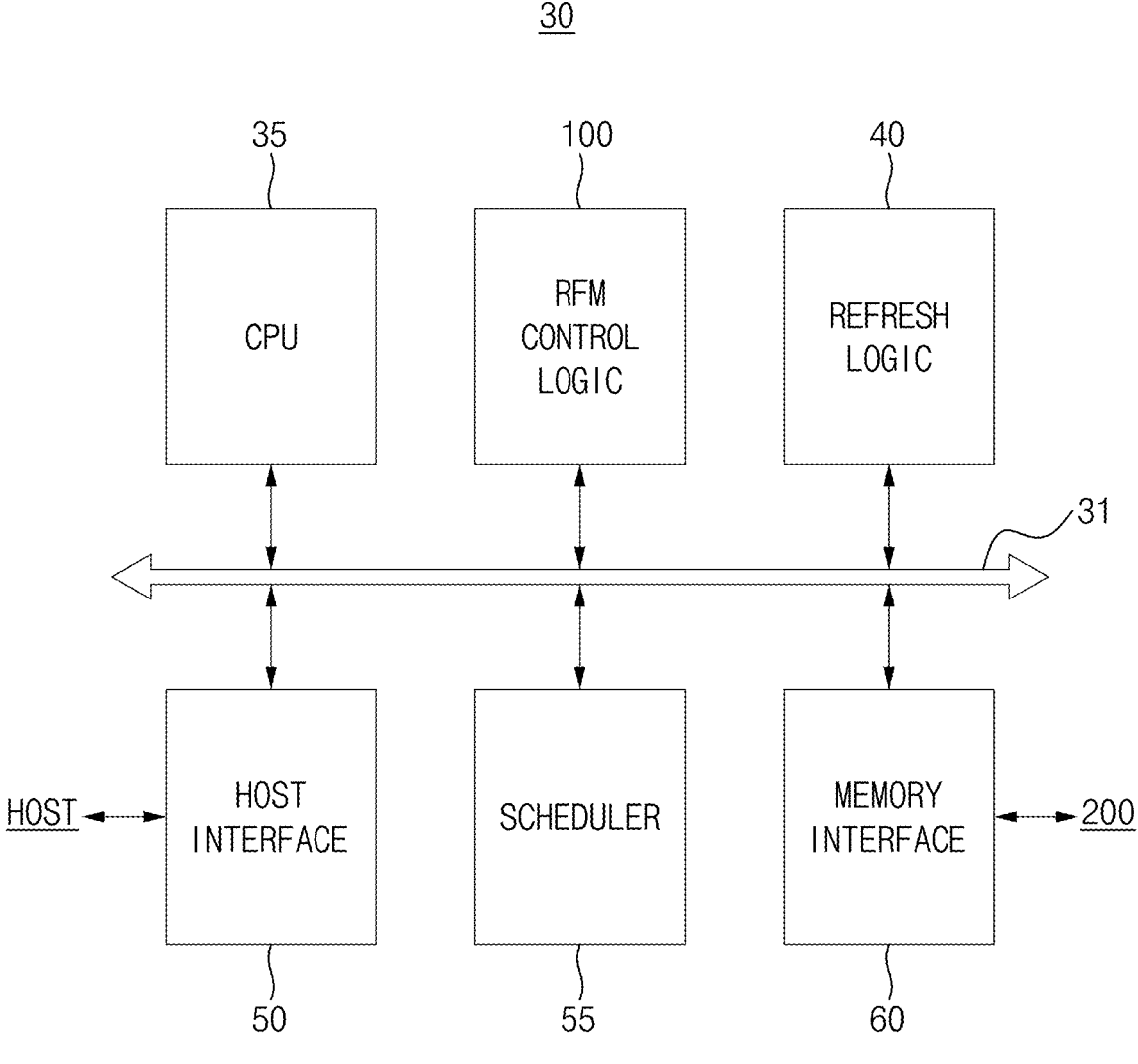
FIG. 2 is a block diagram illustrating the memory controller in FIG. 1 according to one or more example embodiments.

FIG. 2 is a block diagram illustrating the memory controller in FIG. 1 according to one or more example embodiments.

Referring to FIG. 2, the memory controller 30 may include the CPU 35, the RFM control logic 100, a refresh logic 40, a host interface 50, a scheduler 55 and a memory interface 60 which are connected to each other through a bus 31.

The CPU 35 may control overall operation of the memory controller 30. The CPU 35 may control the RFM control logic t 100, the refresh logic 40, the host interface 50, the scheduler 55 and the memory interface 60 through the bus 31.

The refresh logic 40 may generate auto refresh command for refreshing memory cells of the plurality of memory cell rows based on a refresh interval of the semiconductor memory device 200.

The host interface 50 may perform interfacing with a host. The memory interface 60 may perform interfacing with the semiconductor memory device 200.

The scheduler 55 may manage scheduling and transmission of sequences of commands generated in the memory controller 30. The scheduler 55 may transmit the active command and subsequent commands to the semiconductor memory device 200 via the memory interface 60 and the semiconductor memory device 200 may update active count of each of the memory cell rows to may manage the row hammer of all of the memory cell rows.

The RFM control logic 100 may applies a refresh management command to the semiconductor memory device 200 through the memory interface 60 in response to a transition of the alert signal ALRT from the semiconductor memory device 200 such that the semiconductor memory device 200 performs a hammer refresh operation on one or more victim memory cell rows which are physically adjacent to a memory cell row corresponding to the hammer address.

Figure 3:
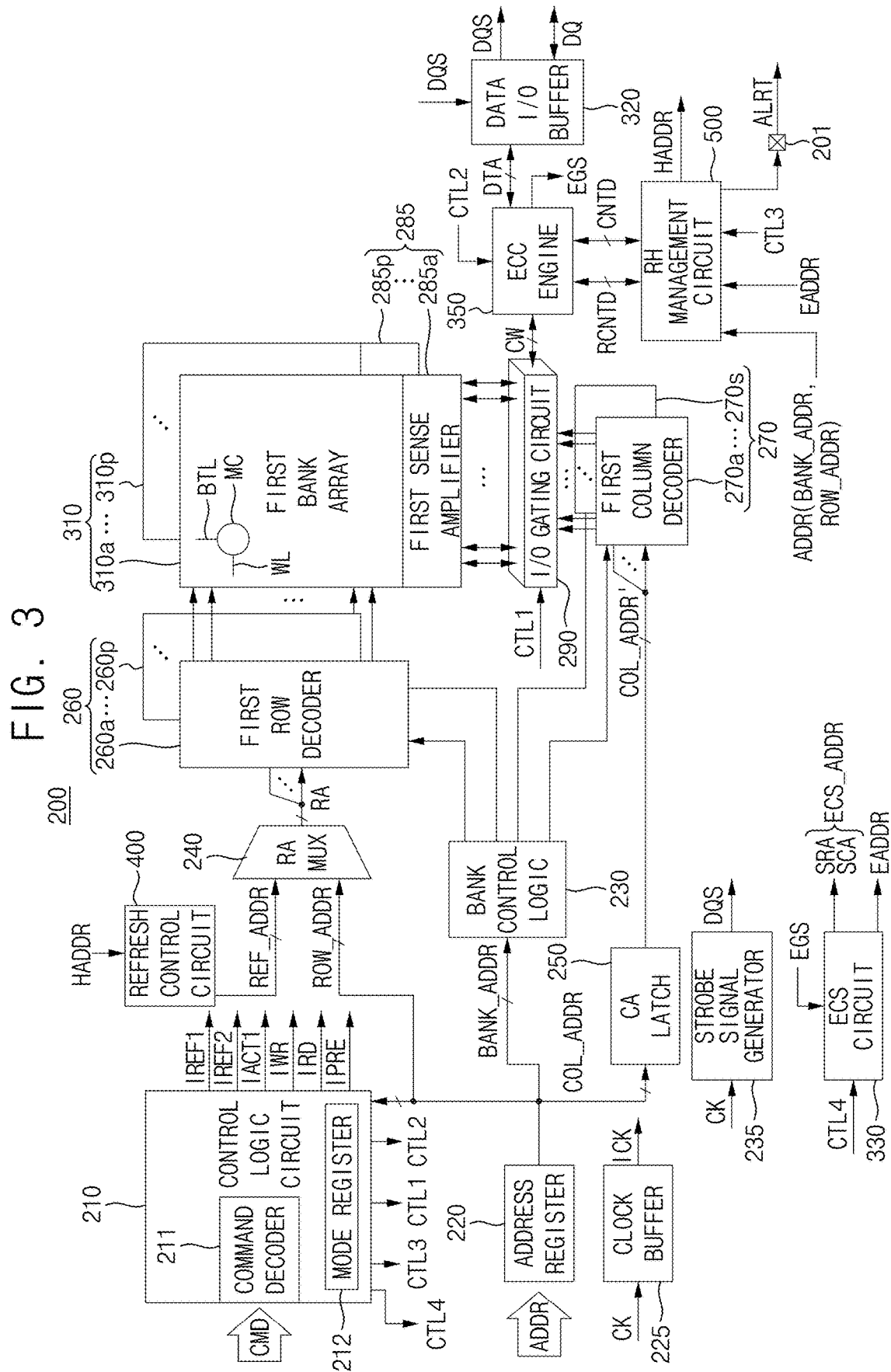
FIG. 3 is a block diagram illustrating an example of the semiconductor memory device in FIG. 1 according to one or more example embodiments.

FIG. 3 is a block diagram illustrating an example of the semiconductor memory device in FIG. 1 according to one or more example embodiments.

Referring to FIG. 3, the semiconductor memory device 200 may include the control logic circuit 210, an address register 220, a bank control logic 230, a refresh control circuit 400, a row address multiplexer 240, a column address latch 250, a row decoder 260, a column decoder 270, the memory cell array 310, a sense amplifier unit 285, an I/O gating circuit 290, an error correction code (ECC) engine 350, a clock buffer 225, a strobe signal generator 235, the ECS circuit 330, the row hammer management circuit 500 and a data I/O buffer 320.

The memory cell array 310 may include first through sixteenth bank arrays 310a~310p. The row decoder 260 may include first through sixteenth row decoders 260a~260p respectively coupled to the first through sixteenth bank arrays 310a~310p, the column decoder 270 may include first through sixteenth column decoders 270a~270p respectively coupled to the first through sixteenth bank arrays 310a~310p, and the sense amplifier unit 285 may include first through sixteenth sense amplifiers 285a~285p respectively coupled to the first through sixteenth bank arrays 310a~310p.

The first through sixteenth bank arrays 310a~310p, the first through sixteenth row decoders 260a~260p, the first through sixteenth column decoders 270a~270p and first through sixteenth sense amplifiers 285a~285p may form first through sixteenth banks. Each of the first through sixteenth bank arrays 310a~310p includes a plurality of memory cells MC formed at intersections of a plurality of word-lines WL and a plurality of bit-lines BTL.

The address register 220 may receive the address ADDR including a bank address BANK_ADDR, a row address ROW_ADDR and a column address COL_ADDR from the memory controller 30. The address register 220 may provide the received bank address BANK_ADDR to the bank control logic 230, may provide the received row address ROW-_ADDR to the row address multiplexer 240, and may provide the received column address COL_ADDR to the column address latch 250. In addition, the address register 220 may provide the received bank address BANK_ADDR and the received row address ROW_ADDR to the row hammer management circuit 500.

The bank control logic 230 may generate bank control signals in response to the bank address BANK_ADDR. One of the first through sixteenth row decoders 260a~260p corresponding to the bank address BANK_ADDR is activated in response to the bank control signals, and one of the first through sixteenth column decoders 270a~270p corresponding to the bank address BANK_ADDR is activated in response to the bank control signals.

The row address multiplexer 240 may receive the row address ROW_ADDR from the address register 220, and may receive a refresh row address REF_ADDR from the refresh control circuit 400. The row address multiplexer 240 may selectively output the row address ROW_ADDR or the refresh row address REF_ADDR as a row address RA. The row address SRA that is output from the row address multiplexer 240 is applied to the first through sixteenth row decoders 260a~260p.

The refresh control circuit 400 may sequentially increase or decrease the refresh row address REF_ADDR in a normal refresh mode in response to first and second refresh control signals IREF1 and IREF2 from the control logic circuit 210. The refresh control circuit 400 may receive a hammer address HADDR in a hammer refresh mode, and may output one or more hammer refresh addresses designating one or more victim memory cell rows physically adjacent to a memory cell row corresponding to the hammer address as the refresh row address REF_ADDR.

The activated one of the first through sixteenth row decoders 260a~260p, by the bank control logic 230, may decode the row address RA that is output from the row address multiplexer 240, and may activate a word-line corresponding to the row address RA. For example, the activated bank row decoder applies a word-line driving voltage to the word-line corresponding to the row address.

The column address latch 250 may receive the column address COL_ADDR from the address register 220, and may temporarily store the received column address COL_ADDR. In one or more embodiments, in a burst mode, the column address latch 250 may generate column address COL_ADDR' that increment from the received column address COL_ADDR. The column address latch 250 may apply the temporarily stored or generated column address COL_ADDR' to the first through sixteenth column decoders 270a~270p.

The activated one of the first through sixteenth column decoders 270a~270p activates a sense amplifier corresponding to the bank address BANK_ADDR and the column address COL_ADDR through the I/O gating circuit 290.

The I/O gating circuit 290 may include a circuitry for gating input/output data, and may further include input data mask logic, read data latches for storing data that is output from the first through sixteenth bank arrays 310a~310p, and write drivers for writing data to the first through sixteenth bank arrays 310a~310p.

Codeword CW (e.g., read codeword RCW in FIG. 18) read from a selected one bank array of the first through sixteenth bank arrays 310a~310p is sensed by a sense amplifier coupled to the selected one bank array from which the data is to be read, and is stored in the read data latches. The codeword CW stored in the read data latches may be provided to the data I/O buffer 320 as data DTA (e.g., corrected data C_DTA in FIG. 18) after ECC decoding is performed on the codeword CW by the ECC engine 350.

The data I/O buffer 320 may convert the data DTA into the data signal DQ and may transmit the data signal DQ along with the data strobe signal DQS to the memory controller 30.

The data signal DQ to be written in a selected one bank array of the first through sixteenth bank arrays 310a~310p may be provided to the data I/O buffer 320 from the memory controller 30. The data I/O buffer 320 may convert the data signal DQ to the data DTA and may provide the data DTA to the ECC engine 350. The ECC engine 350 may perform an ECC encoding on the data DTA to generate parity bits, and the ECC engine 350 may provide the codeword CW including data DTA and the parity bits to the I/O gating circuit 290. The I/O gating circuit 290 may write the codeword CW in a sub-page in the selected one bank array through the write drivers.

The data I/O buffer 320 may provide the data signal DQ from the memory controller 30 to the ECC engine 350 by converting the data signal DQ to the data DTA in a write operation of the semiconductor memory device 200 and may convert the data DTA to the data signal DQ from the ECC engine 350 and may transmit the data signal DQ and the data strobe signal DQS to the memory controller 30 in a read operation of the semiconductor memory device 200.

The ECC engine 350 may perform an ECC encoding on the data DTA and may perform an ECC decoding on the codeword CW based on a second control signal CTL2 from the control logic circuit 210. The ECC engine 350 may perform an ECC encoding and an ECC decoding on a count data CNTD provided from the row hammer management circuit 500 based on the second control signal CTL2 from the control logic circuit 210.

The clock buffer 225 may receive the clock signal CK, may generate an internal clock signal ICK by buffering the clock signal CK, and may provide the internal clock signal ICK to circuit components processing the command CMD and the address ADDR.

The strobe signal generator 235 may receive the clock signal CK, may generate the data strobe signal DQS based on the clock signal CK and may provide the data strobe signal DQS to the data I/O buffer 320.

The ECS circuit 330 may generate scrubbing addresses ECS_ADDR for performing a scrubbing operation in the ECS mode and may provide the scrubbing addresses ECS_ADDR to the row decoder 260 and the column decoder 270 sequentially. Each of the scrubbing addresses ECS_ADDR may include scrubbing row address SRA and a scrubbing column address SCA based on a fourth control signal CTL4 from the control logic circuit 210.

The ECC engine 350 may perform a scrubbing operation to perform an ECC decoding on data read from the a first memory cell row designated by one of the scrubbing addresses ECS_ADDR by unit of a codeword based on the scrubbing row address SRA and the scrubbing column address SCA to detect an error bit, to correct and error bit and to write back a corrected codeword in a corresponding memory location of the first memory cell row in the ECS mode based on the third control signal CTL3. The ECC engine 350 may generate an error generation signal EGS based on a result of the ECC decoding when the error bit is detected and may provide the error generation signal EGS to the ECS circuit 330.

The ECS circuit 330 may provide the row hammer management circuit 500 with at least one of the scrubbing addresses ECS_ADDR as the error address EADDR based on the error generation signal EGS in the ECS mode.

The ECS circuit 330 may provide the row hammer management circuit 500 with scrubbing addresses ECS_ADDR as the error address EADDR based on the error generation signal EGS when a number of error bits detected by unit of codeword is equal to or greater than a first number. The first number may be a natural number.

The row hammer management circuit 500, in the ECS mode, may store an error flag with a first logic level in a portion of count cells to store count data, of each of one or more adjacent memory cell rows which are physically adjacent to a weak memory cell row corresponding to the error address from among the plurality of memory cell rows.

The row hammer management circuit 500 may count the number of times of access associated with each of the plurality of memory cell rows based on an access address ADDR including the row address ROW_ADDR and the bank address BANK_ADDR accompanied by an active command from the memory controller 30 to store the counted values in the count cells of each of the plurality of memory cell rows as the count data CNTD. The row hammer management circuit 500, in a normal mode, may compare counted values indicating a number of times of access associated with each of the plurality of memory cell rows with different reference number of times based on a logic level of the error flag, may store one or more candidate hammer addresses, which are intensively accessed from among the plurality of memory cell rows, in a hammer address queue therein based on a result of the comparison and may output one of the one or more candidate hammer addresses as a hammer address HADDR to the refresh control circuit 400.

The row hammer management circuit 500 may provide an address of a memory cell row which is intensively accessed as the hammer address HADDR to the refresh control circuit 400 based on the result of the comparison.

The row hammer management circuit 500 may change a logic level of an alert signal ALRT output to the memory controller 30 through a pin 201 when the row hammer management circuit 500 outputs the hammer address HADDR.

The control logic circuit 210 may control operations of the semiconductor memory device 200. For example, the control logic circuit 210 may generate control signals for the semiconductor memory device 200 in order to perform a write operation, a read operation, a normal refresh operation and a hammer refresh operation. The control logic circuit 210 may include a command decoder 211 that decodes the command CMD received from the memory controller 30 and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may provide a first control signal CTL1 to the I/O gating circuit, the second control signal CTL2 to the ECC engine 350, the third control signal CTL3 to the row hammer management circuit 500 and the fourth control signal CTL4 to the ECS circuit 330. In addition, the command decoder 211 may generate internal command signals including the first refresh control signal IREF1, the second refresh control signal IREF2, an active signal IACT1, a precharge signal IPRE, a read signal IRD and a write signal IWR by decoding the command CMD.

Figure 4:
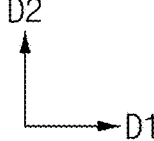
FIG. 4 illustrates an example of the first bank array in the semiconductor memory device of FIG. 3.

FIG. 4 illustrates an example of the first bank array in the semiconductor memory device of FIG. 3.

Referring to FIG. 4, the first bank array 310a includes a plurality of word-lines WL0~WLm−1 (m is a natural number greater than two), a plurality of bit-lines BTL0~BTLn−1

(n is a natural number greater than two), and a plurality of memory cells MCs disposed at intersections between the word-lines WL0~WLm−1 and the bit-lines BTL0~BTLn−1. Each of the memory cells MCs includes a cell transistor coupled to each of the word-lines WL0~WLm−1 and each of the bit-lines BTL0~BTLn−1 and a cell capacitor coupled to the cell transistor. Each of the memory cells MCs may have a DRAM cell structure. Each of the word-lines WL0~WLm−1 extends in a first direction D1 and each of the bit-lines BTL0~BTLn−1 extends in a second direction D2 crossing the first direction D1.

The word-lines WL0~WLm−1 coupled to the plurality of memory cells MCs may be referred to as rows of the first bank array 310a and the bit-lines BTL0~BTLn−1 coupled to the plurality of memory cells MCs may be referred to as columns of the first bank array 310a.

Figure 5:
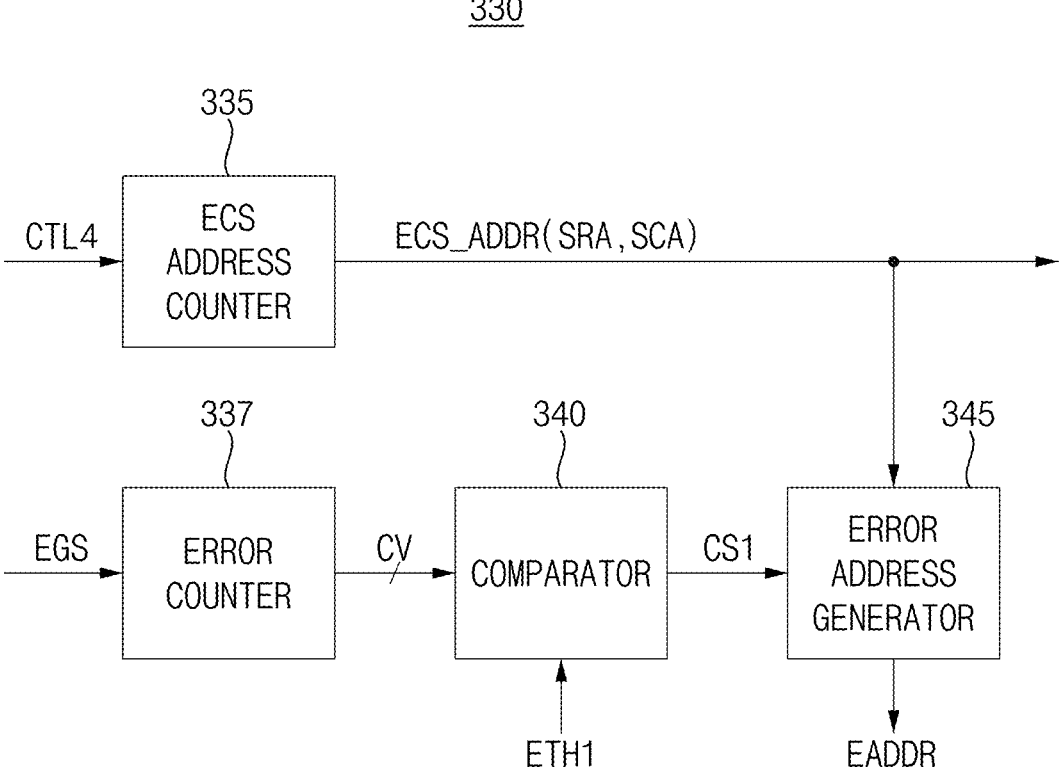
FIG. 5 is a block diagram illustrating an example of the ECS circuit in FIG. 3 according to one or more example embodiments.

FIG. 5 is a block diagram illustrating an example of the ECS circuit in FIG. 3 according to one or more example embodiments.

Referring to FIG. 5, the ECS circuit 330 may include an ECS address counter 335, an error counter 337, a comparator 340 and an error address generator 345.

The ECS address counter 335 may generate the scrubbing addresses ECS_ADDR by sequentially increasing or decreasing the scrubbing addresses ECS_ADDR based on an ECS mode signal included in the fourth control signal CTL4. Each of the scrubbing addresses ECS_ADDR may include the scrubbing row address SRA and the scrubbing column address SCA.

The error counter 337 may generate error counted value ECV by counting the error generating signal EGS provided from the ECC engine 320 in the ECS mode. The comparator 340 may generate a comparison signal CS1 comparing the error counted value ECV with a reference error number ETH1. The comparator 340 may generate the comparison signal CS1 having a first logic level (i.e., a logic high level) in response to the error counted value ECV being equal to or greater than the reference error number ETH1. The comparator 340 may generate the comparison signal CS1 having a second logic level (i.e., a logic low level) in response to the error counted value ECV being smaller than the reference error number ETH1.

The error address generator 345 may store respective one of the scrubbing addresses ECS_ADDR and selectively output the stored scrubbing address ECS_ADDR as the error address EADDR based on the comparison signal CS1. The error address generator 345 may output the stored scrubbing address ECS_ADDR as the error address EADDR in response to the comparison signal indicating that the error counted value ECV is equal to or greater than the reference error number ETH1 when a number of error bits equal to or greater than the reference error number ETH1 are detected in codewords of a scrubbing target memory cell row designated by the scrubbing address based on a result of the ECC decoding on the scrubbing target memory cell row. The error address generator 345 may provide the error address EADDR to the row hammer management circuit 500 in FIG. 3.

Figure 6:
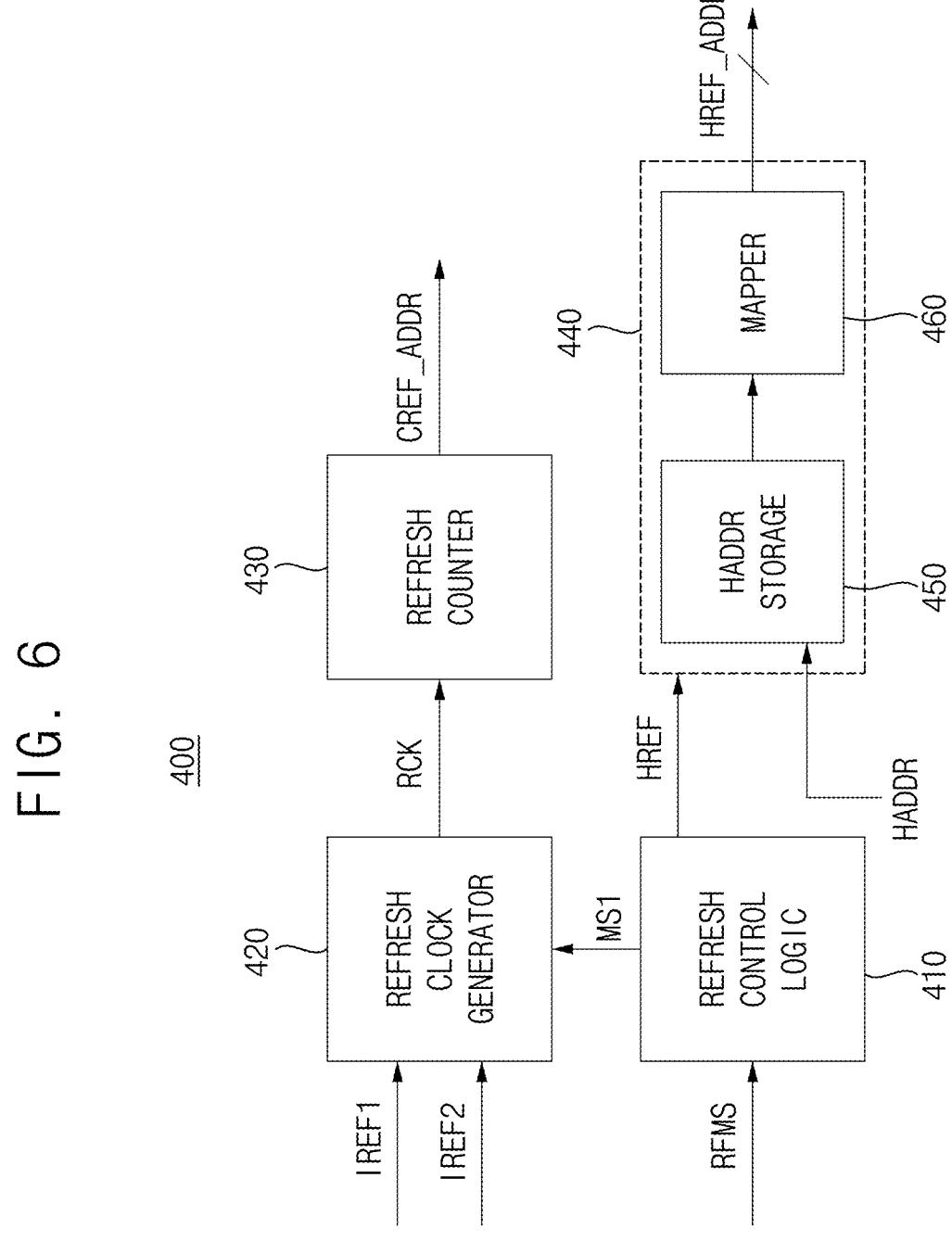
FIG. 6 is a block diagram illustrating an example of the refresh control circuit in FIG. 3 according to one or more example embodiments.

FIG. 6 is a block diagram illustrating an example of the refresh control circuit in FIG. 3 according to one or more example embodiments.

Referring to FIG. 6, the refresh control circuit 400 may include a refresh control logic 410, a refresh clock generator 420, a refresh counter 430 and a hammer refresh address generator 440.

The refresh control logic 410 may provide a mode signal MS1 in response to a refresh management signal RFMS. In addition, the refresh control logic 410 may provide the hammer refresh address generator 440 with a hammer refresh signal HREF to control output timing of the hammer address in response to one of the first refresh control signal IREF1 and the second refresh control signal IREF2.

The control logic circuit 210 in FIG. 3 may provide the refresh control circuit 400 with the refresh management signal RFMS based on a refresh management command from the memory controller 30.

The refresh clock generator 420 may generate a refresh clock signal RCK indicating a timing of a normal refresh operation based on the first refresh control signal IREF1, the second refresh control signal IREF2 and the mode signal MS. The refresh clock generator 420 may generate the refresh clock signal RCK in response to the receiving the first refresh control signal IREF1 or during the second refresh control signal IREF2 is activated.

When the command CMD from the memory controller 30 corresponds to an auto refresh command, the control logic circuit 210 in FIG. 3 may apply the first refresh control signal IREF1 to the refresh control circuit 400 whenever the control logic circuit 210 receives the auto refresh command. When the command CMD from the memory controller 30 corresponds to a self-refresh entry command, the control logic circuit 210 may apply the second refresh control signal IREF2 to the refresh control circuit 400 and the second refresh control signal IREF2 is activated from a time point when the control logic circuit 210 receives the self-refresh entry command to a time point when control logic circuit 210 receives a self-refresh exit command.

The refresh counter 430 may generate a counter refresh address CREF_ADDR designating sequentially the memory cell rows by performing counting operation at the period of the refresh clock signal RCK, and may provide the counter refresh address CREF_ADDR as the refresh row address REF_ADDR to the row address multiplexer 240 in FIG. 3.

The hammer refresh address generator 440 may include a hammer address storage 450 and an mapper 460.

The hammer address storage 450 may store the hammer address HADDR and may output the hammer address HADDR to the mapper 460 in response to the hammer refresh signal HREF. The mapper 460 may generate hammer refresh addresses HREF_ADDR designating one or more victim memory cell rows physically adjacent to a memory cell row corresponding to the hammer address HADDR.

The hammer refresh address generator 440 may provide the hammer refresh address HREF_ADDR as the refresh row address REF_ADDR to the row address multiplexer 240 in FIG. 3.

Figure 7:
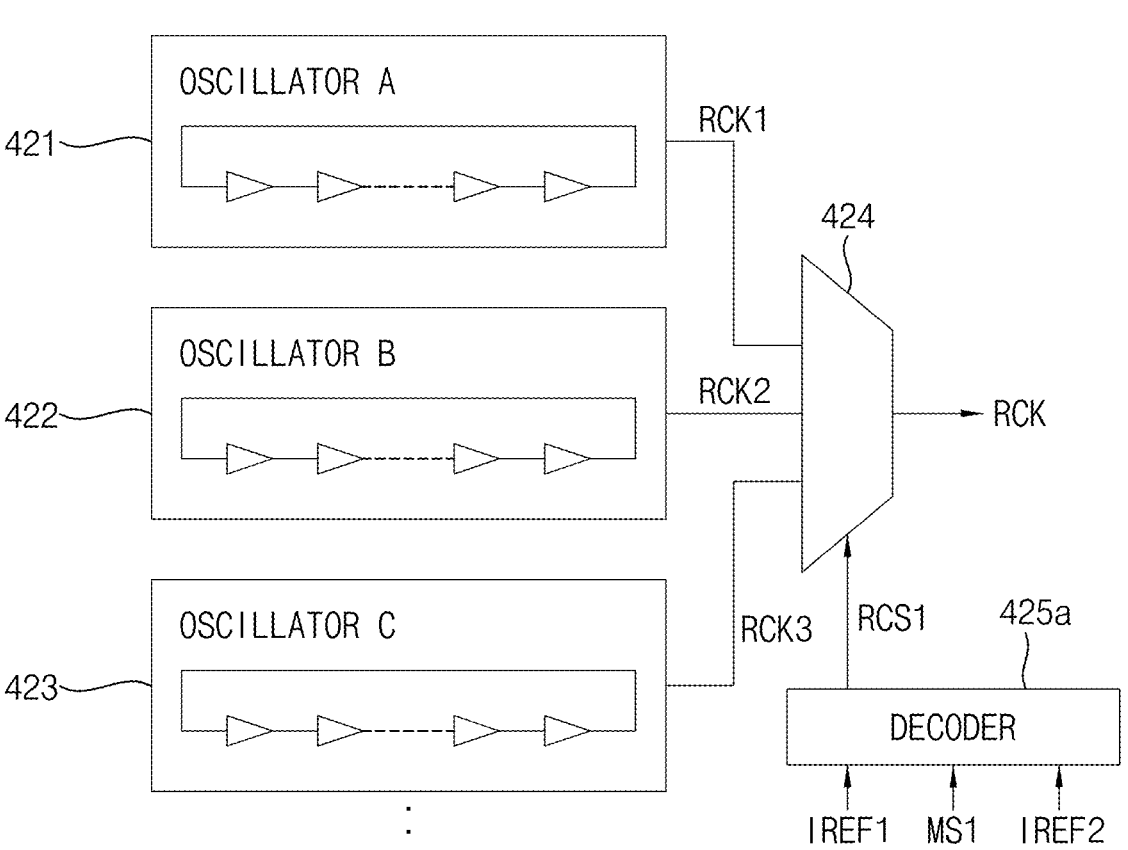
FIG. 7 is a circuit diagram illustrating an example of the refresh clock generator shown in FIG. 6 according to one or more example embodiments.

FIG. 7 is a circuit diagram illustrating an example of the refresh clock generator shown in FIG. 6 according to one or more example embodiments.

Referring to FIG. 7, a refresh clock generator 420a may include a plurality of oscillators (OSCILLATOR A) 421, (OSCILLATOR B) 422 and (OSCILLATOR C) 423, a multiplexer 424 and a decoder 425a. The decoder 425a may decode the first refresh control signal IREF1, the second refresh control signal IREF2 and the mode signal MS1 to output a clock control signal RCS1. The oscillators 421, 422, and 423 generate refresh clock signals RCK1, RCK2 and RCK3 having different periods. The multiplexer 424 selects one of the refresh clock signals RCK1, RCK2 and RCK3 to provide the refresh clock signal RCK in response to the clock control signal RCS1.

Because the mode signal MS1 indicates that the row hammer event occurs, the refresh clock generator 420a may adjust a refresh cycle by selecting one of the refresh clock signals RCK1, RCK2 and RCK3.

Figure 8:
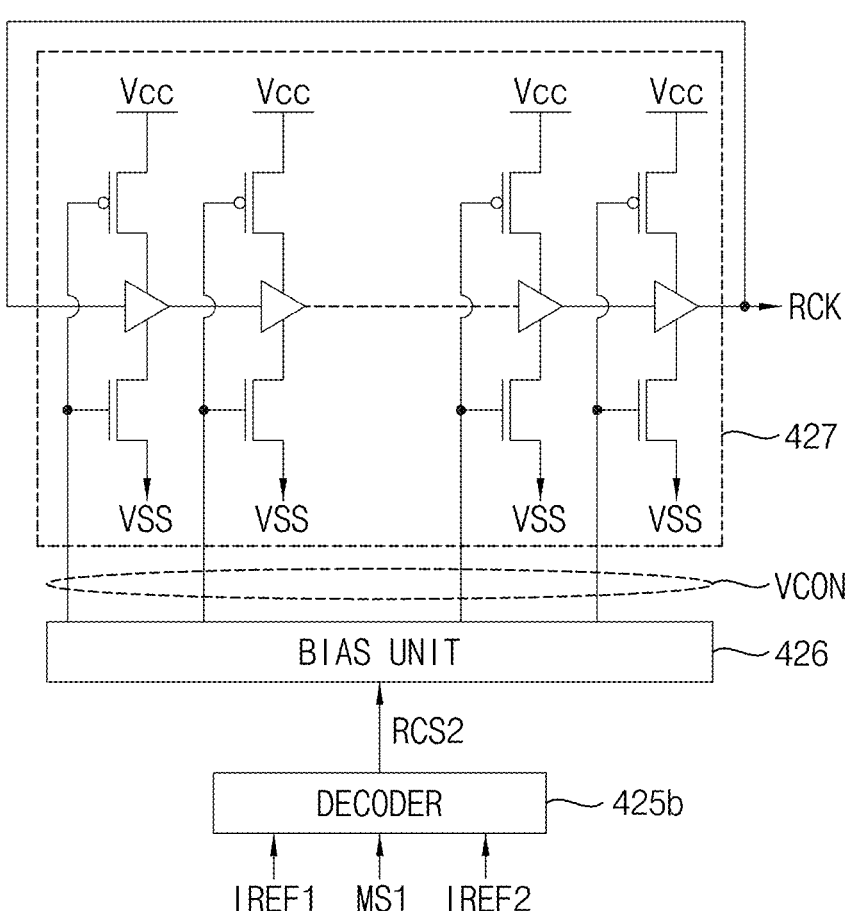
FIG. 8 is a circuit diagram illustrating another example of the refresh clock generator in FIG. 6 according to one or more example embodiments.

FIG. 8 is a circuit diagram illustrating another example of the refresh clock generator in FIG. 6 according to one or more example embodiments.

Referring to FIG. 8, a refresh clock generator 420b may include a decoder 425b, a bias unit 426 and an oscillator 427. The oscillator 427 may include a plurality of delay cells connected in series. Each of the plurality of delay cells may be connected between a power supply voltage Vcc and a ground voltage VSS and each of the plurality of delay cells may include a p-channel metal-oxide semiconductor (PMOS) transistor, a buffer and an n-channel metal-oxide semiconductor (NMOS) transistor connected in series between the power supply voltage Vcc and the ground voltage VSS.

The decoder 425b may decode the first refresh control signal IREF1, the second refresh control signal IREF2 and the mode signal MS1 to output a clock control signal RCS2. The bias unit 426 generates a control voltage VCON in response to the clock control signal RCS2. The oscillator 427 generates the refresh clock signal RCK having a variable period, according to the control voltage VCON applied to gates of the PMOS transistors and the NMOS transistors.

Because the mode signal MS1 indicates that the refresh management signal RFMS has received (that is, the row hammer event occurs), the refresh clock generator 420b may adjust a refresh cycle by varying a period of the refresh clock signal RCK based on the clock control signal RCS2.

Figure 9:
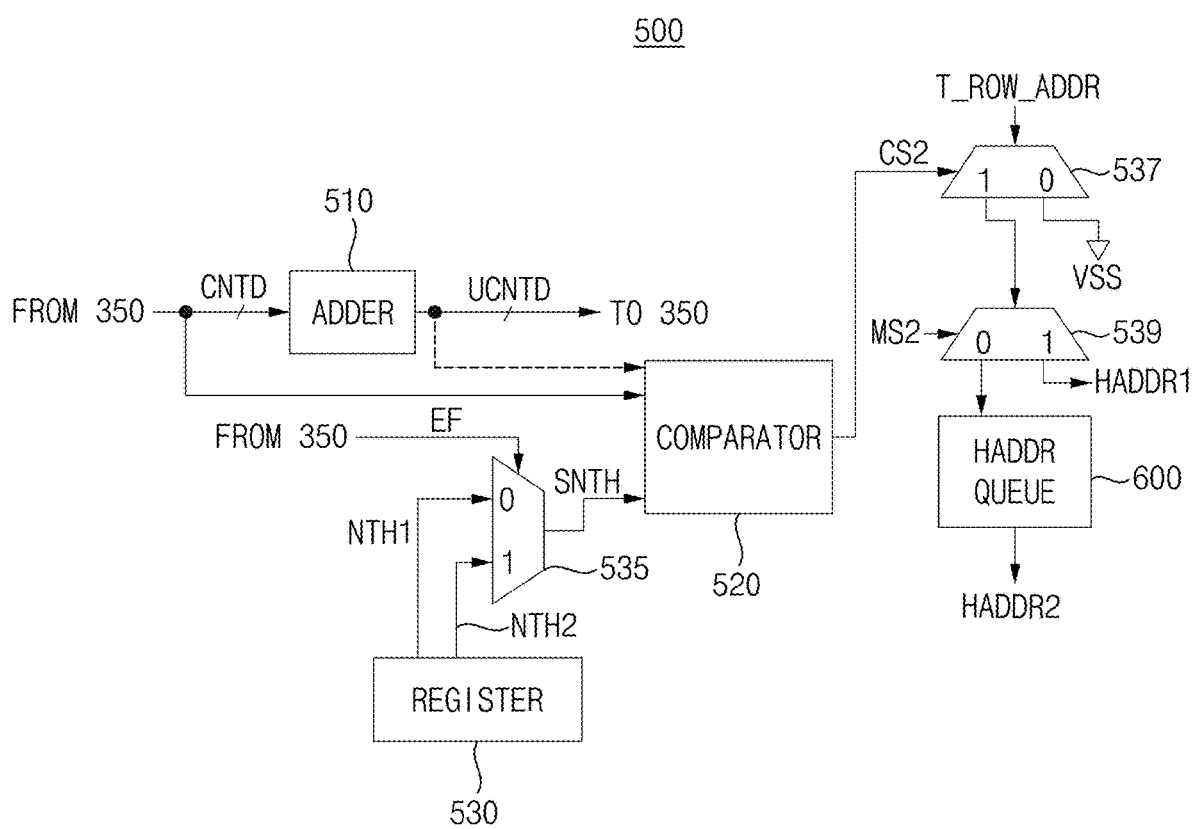
FIG. 9 is a block diagram illustrating an example of the row hammer management circuit in the semiconductor memory device of FIG. 3 according to one or more example embodiments.
Figure 9:
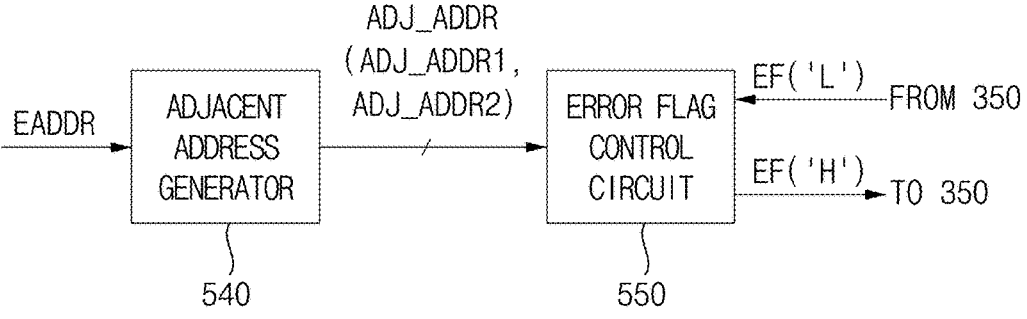

FIG. 9 is a block diagram illustrating an example of the row hammer management circuit in the semiconductor memory device of FIG. 3 according to one or more example embodiments.

Referring to FIG. 9, the row hammer management circuit 500 may include an adder 510, a comparator 520, a register 530, a multiplexer 535, a first demultiplexer 537, a second demultiplexer 539, and adjacent address generator 540, an error flag control circuit 550 and a hammer address queue 600.

The adjacent address generator 540 may receive the error address EADDR in the ECS mode and may generate at least one adjacent address ADJ_ADDR designating at least one adjacent memory cell row which is physically adjacent to a weak memory cell row corresponding to the error address EADDR based on the error address EADDR and may provide the at least one adjacent address ADJ_ADDR to the error flag control circuit 550. The at least one adjacent address ADJ_ADDR may include a first adjacent address ADJ_ADDR1 and a second adjacent address ADJ_ADDR2.

The error flag control circuit 550 may sequentially access a first adjacent memory cell row and a second adjacent memory cell row which are physically adjacent to the weak memory cell row based on the first adjacent address ADJ_ADDR1 and the second adjacent address ADJ_ADDR2 and may store an error flag EF with the first logic level ('H') in the count cells of each of the first adjacent memory cell row and the second adjacent memory cell row.

The adder 510 may update the count data CNTD read from the count cells of the target memory cell row to provide an updated count data UCNTD by increasing the count data CNTD by one, which is read from the count cells of the target memory cell row and an ECC decoding operation is performed on. The adder 510 may update the read count data CNTD. The adder 510 may be implemented with an up-counter.

In one or more example embodiments, the adder 510 may provide the updated count data UCNTD to the comparator 520.

The updated count data UCNTD is provided to the ECC engine 350 and the ECC engine 350 performs an ECC encoding operation on the updated count data UCNTD.

The register 530 may store a first reference number of times NTH1 and a second reference number of times NTH2 smaller than the first reference number of times NTH1.

The multiplexer 535 may provide the comparator 520 with one of the first reference number of times NTH1 and the second reference number of times NTH2 as a selected reference number of times SNTH based on a logic level of the error flag EF read from a portion of the count cells of the target memory cell row. The multiplexer 535 may provide the comparator 520 with the first reference number of times NTH1 as the selected reference number of times SNTH in response to the error flag EF having a second logic level. The multiplexer 535 may provide the comparator 520 with the second reference number of times NTH2 as the selected reference number of times SNTH in response to the error flag EF having a first logic level.

The comparator 520 may compare the read count data CNTD or the updated count data UCNTD with the selected reference number of times SNTH to output a comparison signal CS2 indicating a result of the comparison. The comparator 520 may activate the comparison signal CS2 when the read count data CNTD is equal to or greater than the selected reference number of times SNTH.

The first reference number of times NTH1 may include a first default reference number of times and multiples of the first default reference number of times and the second reference number of times NTH2 may include a second default reference number of times and multiples of the second default reference number of times. Therefore, the comparison signal CS2 may include a plurality of bits.

The first demultiplexer 537 may provide the second demultiplexer 539 with a target row address T_ROW_ADDR designating the target memory cell row in response to the comparison signal CS2 indicating that the read count data CNTD or the updated count data UCNTD is equal to or greater than the selected reference number of times SNTH, and may bypass the target row address T_ROW_ADDR to the ground voltage VSS in response to the comparison signal CS2 indicating that the read count data CNTD or the updated count data UCNTD is smaller than the selected reference number of times SNTH.

The second demultiplexer 539 may store an output of the first demultiplexer 537 in the hammer address queue 600 as a candidate hammer address CHADDR in a non-urgent mode and may provide the output of the first demultiplexer 537 to the refresh control circuit 400 in FIG. 3 as a first hammer address HADDR1 in an urgent mode, based on a mode signal MS2 designating one of the non-urgent mode and the urgent mode.

The hammer address queue 600 may store candidate hammer addresses and may output one of the candidate hammer addresses to the refresh control circuit 400 in FIG. 3 as a second hammer address HADDR2.

The hammer address queue 600 may store target row addresses T_ROW_ADDR which are accessed by a number of times equal to or greater than the first reference number of times NTH1 or the second reference number of times NTH2 as the candidate hammer addresses and may indicate a state of the hammer address queue 600 as a logic level of the alert signal ALRT based on a number of the candidate hammer addresses stored therein.

When the error flag EF read from the count cells of the target memory cell row has a first logic level and the target row address T_ROW_ADDR is accessed by a number of times equal to or greater than the second reference number of times NTH2, the target row address T_ROW_ADDR may be output as the first hammer address HADDR1 in the urgent mode and the target row address T_ROW_ADDR may be stored in the hammer address queue 600 as the candidate hammer address CHADDR in the non-urgent mode. When the error flag EF read from the count cells of the target memory cell row has a second logic level and the target row address T_ROW_ADDR is accessed by a number of times equal to or greater than the first reference number of times NTH1, the target row address T_ROW_ADDR may be output as the first hammer address HADDR1 in the urgent mode and the target row address T_ROW_ADDR may be stored in the hammer address queue 600 as the candidate hammer address CHADDR in the non-urgent mode.

Therefore, the error flag EF associated with adjacent memory cell rows which are physically adjacent to the weak memory cell row in which a number of error bits which are detected is equal to or greater than the reference error number is stored with a first logic level in the ECS mode, and when the error flag EF has a first logic level in the normal mode, the hammer address is determined by comparing the count data CNTD of a corresponding memory cell row with the second reference number of times and one or more victim memory cell rows physically adjacent to a memory cell row corresponding to the hammer address are refreshed. Accordingly, the weak memory cell row may be refreshed more quickly than normal memory cell rows.

Figure 10:
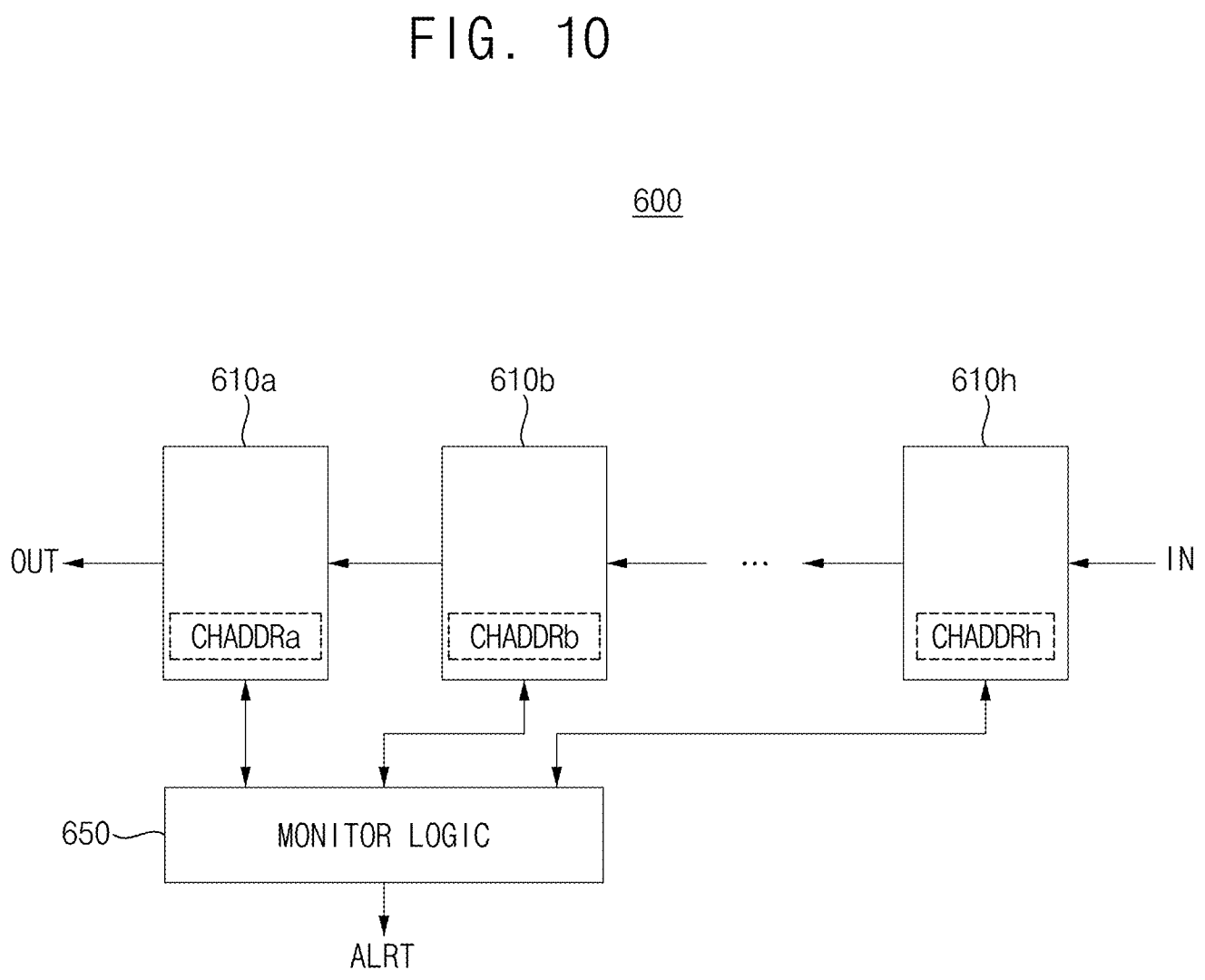

FIG. 10 illustrates an example of the hammer address queue in the row hammer management circuit of FIG. 9 according to one or more example embodiments.

Referring to FIG. 10, the hammer address queue 600 may include a plurality of FIFO registers 610a, 610b, . . . , 610h and a monitor logic 650. A number of the plurality of FIFO registers 610a, 610b, . . . , 610h may correspond to a second number.

The plurality of FIFO registers 610a, 610b, . . . , 610h may store a plurality of candidate hammer addresses CHADDRa, CHADDRb, . . . , CHADDRh up to the second number based on FIFO scheme from an input terminal IN to an output terminal OUT.

The monitor logic 650 may be connected to the plurality of FIFO registers 610a, 610b, . . . , 610h, may manage the plurality of FIFO registers 610a, 610b, . . . , 610h and may monitor whether each of the plurality of FIFO registers 610a, 610b, . . . , 610h stores a candidate hammer address. In response to the number of the candidate hammer addresses stored in the plurality of FIFO registers FIFO registers 610a, 610b, . . . , 610h reaching the second number (that is, in response to the plurality of FIFO registers FIFO registers being full), the monitor logic 650 may output a candidate hammer address that is input first of all from among the candidate hammer addresses as the second hammer address HADDR1 and may notify the memory controller 30 of a state of the hammer address queue 600 by transiting a logic level of the alert signal ALRT from a second logic level to a first logic level different from the second logic level in response to outputting the second hammer address HADDR2.

In response to a transition of the alert signal ALRT, the memory controller 30 of FIG. 2 applies a refresh management command to the semiconductor memory device 200, and the monitor logic 650 may transit the alert signal ALRT to the second logic level in response to the hammer refresh operation based on the hammer address HADDR is completed.

In one or more example embodiments, the hammer address queue 600 may include a plurality of registers and a monitor logic. The plurality of registers may store plurality of candidate hammer addresses up to the second number based on a predetermined priority instead of FIFO scheme.

Figure 11A:
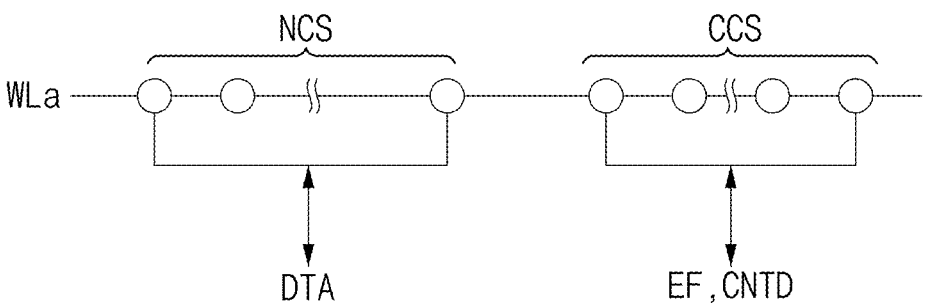
FIG. 11A illustrates memory cells in the first bank array of FIG. 4 according to example embodiments.

FIG. 11A illustrates memory cells in the first bank array of FIG. 4 according to one or more example embodiments.

In FIG. 11A, memory cells coupled to a word-line WLa are illustrated for example.

Referring to FIG. 11A, normal cells NCS and count cells CCS are may be coupled to the word-line WLa, the data DTA may be stored in or read from the normal cells NCS and the error flag EF and the count data CNTD may be stored in or read from the count cells CCS.

Figure 11B:
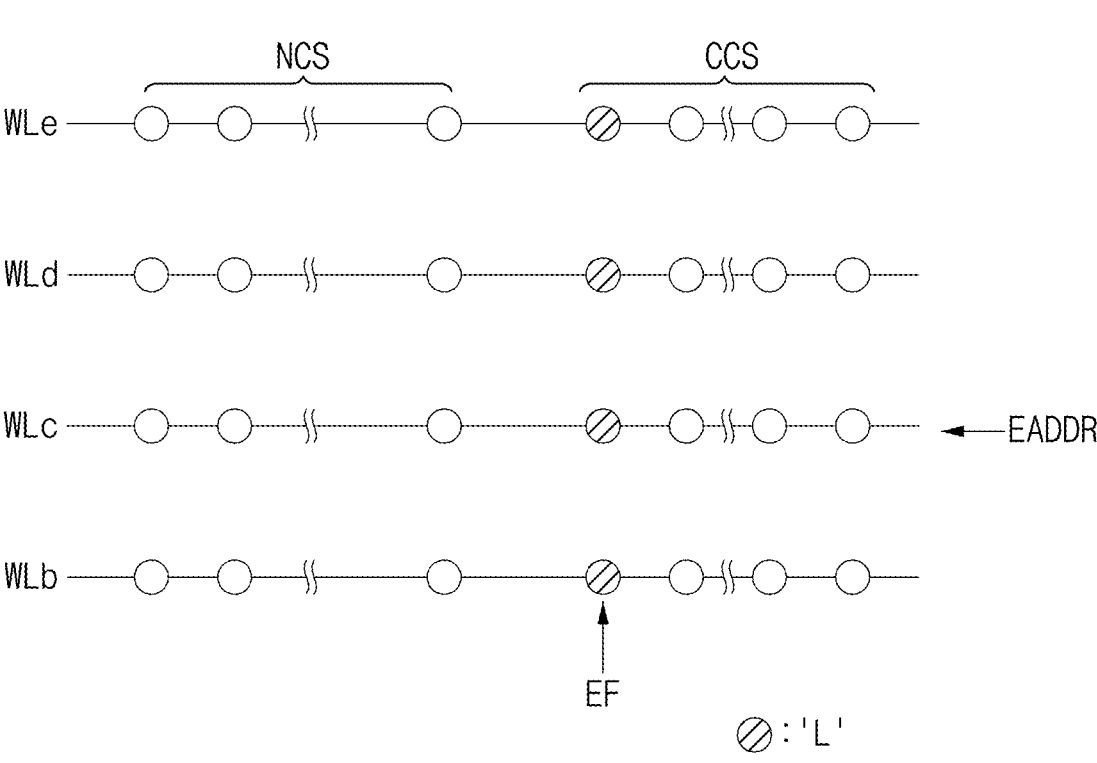

FIGS. 11B, 11C and 11D illustrate a scrubbing operation and a refresh operation according to example embodiments, respectively.

In each of FIGS. 11B, 11C and 11D, normal cells NCS and count cells CCS are may be coupled to word-lines WLb, WLb, WLd and WLe.

Referring to FIG. 11B, a portion of the count cells CCS may be allocated to store the error flag EF.

In FIG. 11B, the error flag EF may be stored with a second logic level ('L') in a portion of the count cells CCS coupled to respective one of the word-lines WLa, WLb, WLc and WLd and the ECS circuit 330 provide the row hammer management circuit 500 an address of the word-line WLc as the error address EADDR based on a result the scrubbing operation.

Referring to FIG. 11C, the adjacent address generator 540 in FIG. 9 may generate addresses of the word-lines WLb and WLd physically adjacent to the address WLc corresponding to the error address EADDR as adjacent addresses ADJ_ADDRa and ADJ_ADDRb and the error flag control circuit 550 in FIG. 9 sequentially accesses adjacent memory cell rows designated by the adjacent addresses ADJ_ADDRa and ADJ_ADDRb and stores the error flag EF with the first logic level ('H') in the count cells of each of the adjacent memory cell rows.

Referring to FIG. 11D, in the normal mode, when a number of access times on a memory cell row coupled to the word-line WLd becomes equal to or greater than the second reference number of time NTH2 and an address of the word-lines WLd is determined as a hammer address HADDRa, the address of the word-lines WLd is provided to the refresh control circuit 400 as the hammer address HADDRa and the refresh control circuit 400 outputs addresses of the word-lines WLc and WLe, which are physically adjacent to the word-line WLd as hammer refresh addresses HREF_ADDRa_1 and HREF_ADDRa_2. Therefore, a hammer refresh operation may be performed on memory cell rows corresponding to the word-lines WLc and WLe.

Accordingly, a hammer refresh operation on the word-line WLc corresponding to the error address EADDR may be performed based on smaller reference number of times than a hammer refresh operation on the word-lines WLb and WLd.

Figure 12:
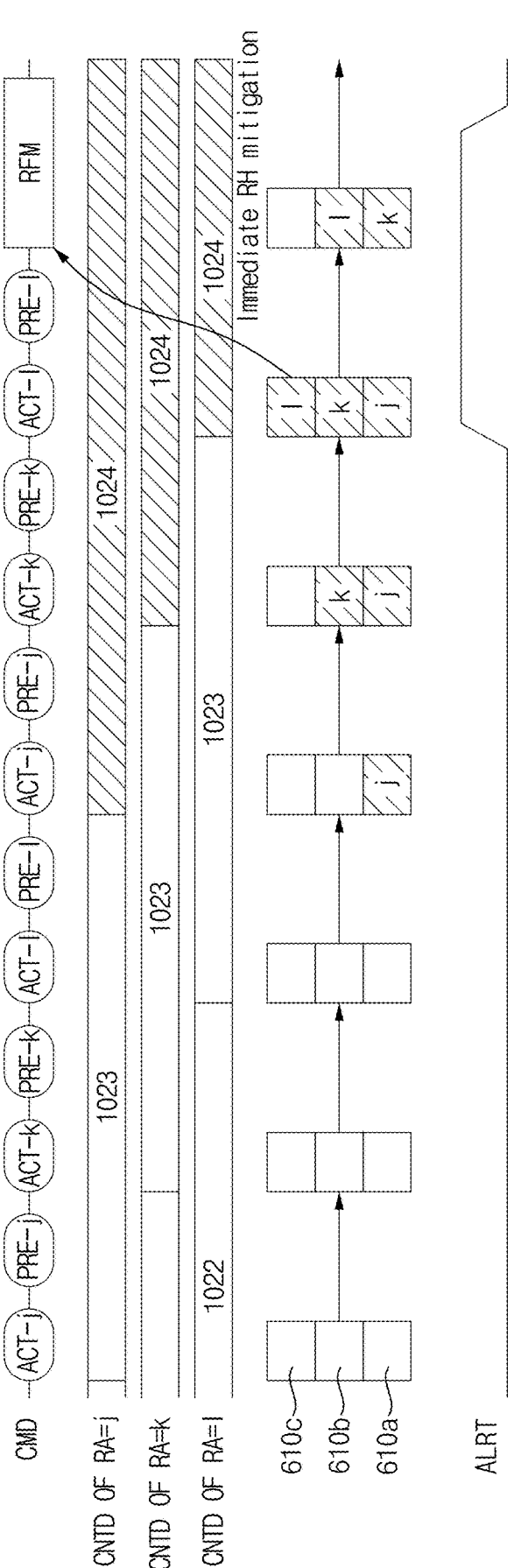
FIG. 12 is a timing diagram illustrating an example operation of the hammer address queue of FIG. 10 according to one or more example embodiments.

FIG. 12 is a timing diagram illustrating an example operation of the hammer address queue of FIG. 10 according to one or more example embodiments.

In FIG. 12, it is assumed that the plurality of FIFO registers 610a, 610b, . . . , 610h in FIG. 11 include three FIFO registers 610a, 610b and 610c and accesses on memory cell rows designated by a row address RA=j, a row address RA=k and a row address RA=1 are repeated. In addition, it is assumed that the error flag EF of each of the memory cell rows designated by the row address RA=j, the row address RA=k and the row address RA=1 has a second logic level and the first reference number of times NTH1 corresponds to 1024.

In FIG. 12, ACT-j denotes an active command accompanying the row address RA=j, PRE-j denotes a precharge command on a memory cell row designated by the row address RA=j, ACT-k denotes an active command accompanying the row address RA=k PRE-k denotes a precharge command on a memory cell row designated by the row address RA=k, ACT-1 denotes an active command accompanying the row address RA=1, and PRE-1 denotes a precharge command on a memory cell row designated by the row address RA=1.

Referring to FIGS. 11 and 12, in response to the counted value (i.e., the count data CNTD) associated with the memory cell row designated by the row address RA=j reaching 1024, the row address RA=j is stored in the FIFO register 610a as a candidate hammer address, in response to the counted value (i.e., the count data CNTD) associated with the memory cell row designated by the row address RA=k reaching 1024, the row address RA=k is stored in the FIFO register 610b as a candidate hammer address, and in response to the counted value (i.e., the count data CNTD) associated with the memory cell row designated by the row address RA=1 reaching 1024, the row address RA=1 is stored in the FIFO register 610a as a candidate hammer address.

Because all of the FIFO registers 610a, 610b and 610c store candidate hammer addresses, the monitor logic 650 notifies the memory controller 30 of the hammer address queue 600 being full (that is, there being no available space in the hammer address queue 600) by transiting the alert signal ALRT to the first logic level. The memory controller 30, in response to transition of the alert signal ALRT, may withhold application of the active command to the semiconductor memory device 200 and may apply a refresh management command RFM to the semiconductor memory device 200. The monitor logic 650 may transit the alert signal ALRT from the first logic level to the second logic level in response to the row address RA=j stored in the FIFO register 610a being output as the hammer address.

The refresh control circuit 400 in FIG. 6 may perform a hammer refresh operation on one or more victim memory cell rows which are physically adjacent to a memory cell row corresponding to the hammer address. The hammer refresh operation is represented by Immediate RH mitigation in FIG. 12.

Figure 13:
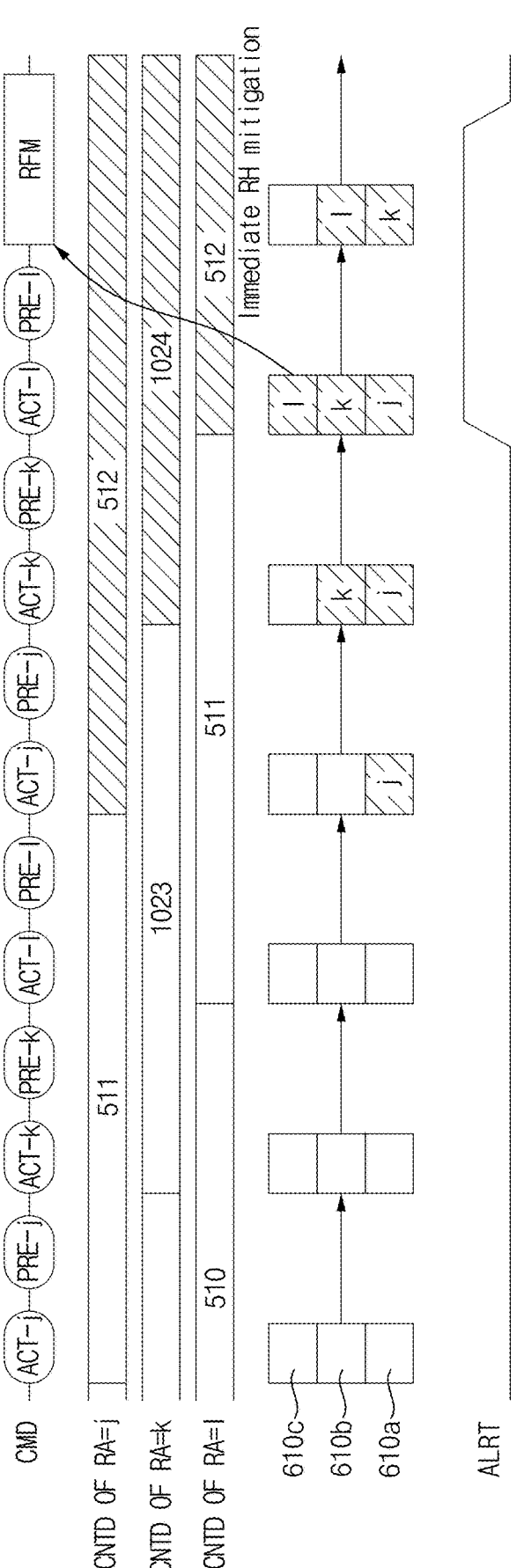
FIG. 13 is a timing diagram illustrating an example operation of the hammer address queue of FIG. 10 according to one or more example embodiments.

FIG. 13 is a timing diagram illustrating an example operation of the hammer address queue of FIG. 10 according to one or more example embodiments.

In FIG. 13, it is assumed that the plurality of FIFO registers 610a, 610b, . . . , 610h in FIG. 11 include three FIFO registers 610a, 610b and 610c and accesses on memory cell rows designated by a row address RA=j, a row address RA=k and a row address RA=1 are repeated. In addition, it is assumed that the error flag EF of each of the memory cell rows designated by the row address RA=j, the row address RA=k and the row address RA=1 has a second logic level, the first reference number of times NTH1 corresponds to 1024 and the second reference number of times NTH2 corresponds to 512.

In FIG. 13, ACT-j denotes an active command accompanying the row address RA=j, PRE-j denotes a precharge command on a memory cell row designated by the row address RA=j, ACT-k denotes an active command accompanying the row address RA=k PRE-k denotes a precharge command on a memory cell row designated by the row address RA=k, ACT-1 denotes an active command accompanying the row address RA=1, and PRE-1 denotes a precharge command on a memory cell row designated by the row address RA=1.

Referring to FIGS. 10 and 13, in response to the counted value (i.e., the count data CNTD) associated with the memory cell row designated by the row address RA=j reaching 512, the row address RA=j is stored in the FIFO register 610a as a candidate hammer address, in response to the counted value (i.e., the count data CNTD) associated with the memory cell row designated by the row address RA=k reaching 1024, the row address RA=k is stored in the FIFO register 610b as a candidate hammer address, and in response to the counted value (i.e., the count data CNTD) associated with the memory cell row designated by the row address RA=1 reaching 512, the row address RA=1 is stored in the FIFO register 610a as a candidate hammer address.

Because all of the FIFO registers 610a, 610b and 610c store candidate hammer addresses, the monitor logic 650 notifies the memory controller 30 of the hammer address queue 600 being full (that is, there being no available space in the hammer address queue 600) by transiting the alert signal ALRT to the first logic level. The memory controller 30, in response to transition of the alert signal ALRT, may withhold application of the active command to the semiconductor memory device 200 and may apply a refresh management command RFM to the semiconductor memory device 200. The monitor logic 650 may transit the alert signal ALRT from the first logic level to the second logic level in response to the row address RA=j stored in the FIFO register 610a being output as the hammer address.

The refresh control circuit 400 in FIG. 6 may perform a hammer refresh operation on one or more victim memory cell rows which are physically adjacent to a memory cell row corresponding to the hammer address. The hammer refresh operation is represented by Immediate RH mitigation in FIG. 13.

In FIGS. 9, 10, 12 and 13, it is described as the row hammer management circuit 500 includes one hammer address queue 600. However, in one or more example embodiments, a plurality of hammer address queues corresponding to a number of the bank arrays 310a~310p may be included in the row hammer management circuit 500 and one hammer address queue may correspond to one bank array. When a first hammer address queue of the plurality of hammer address queues is full with candidate hammer addresses, the first hammer address queue may transit a logic level of a corresponding alert signal to a first logic level and the memory controller 30 may applies the refresh management command to the first hammer address queue while performing normal operation on other bank arrays except the first bank array.

Figure 14:
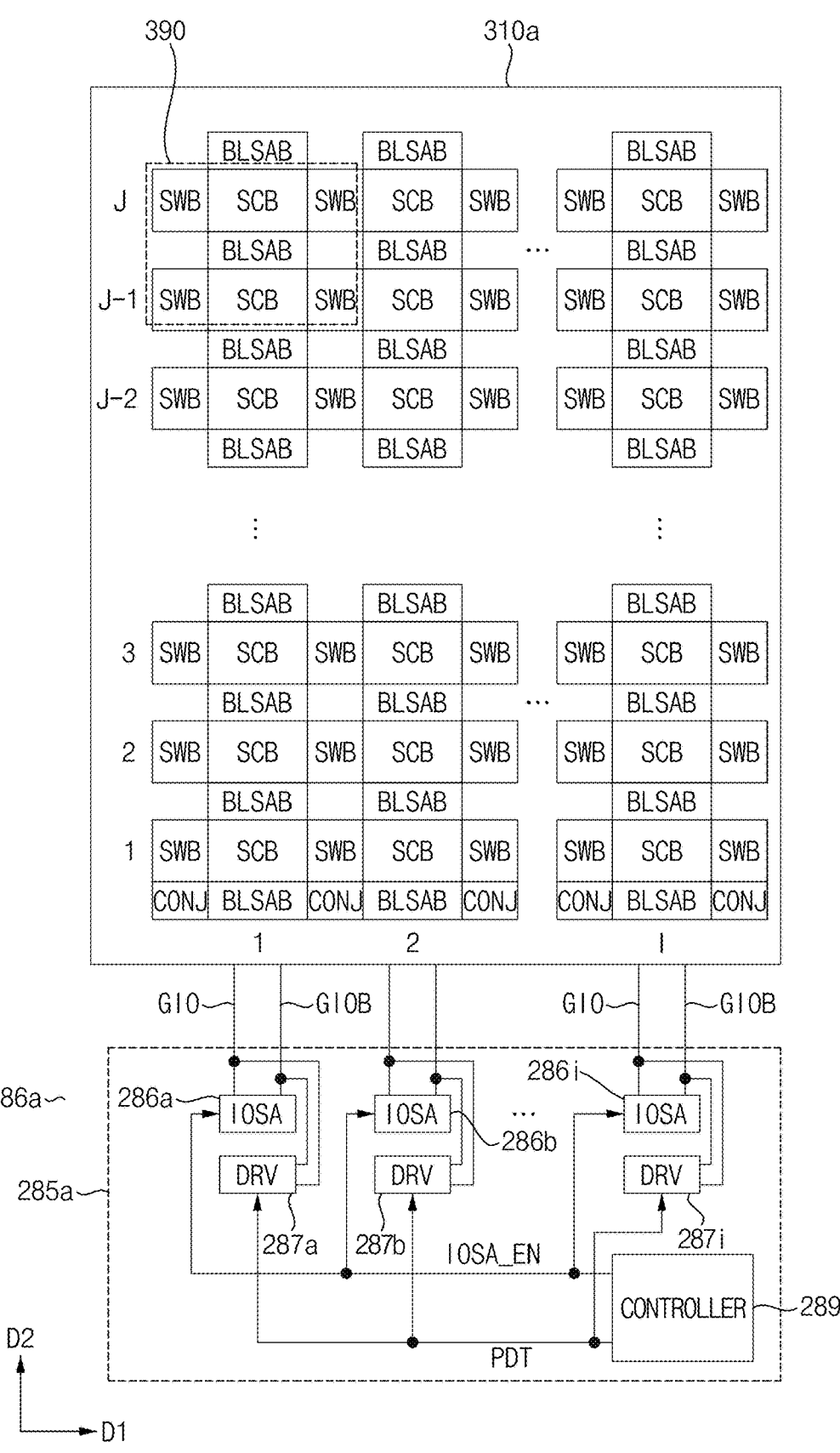
FIG. 14 illustrates the first bank array and the first sense amplifier in the semiconductor memory device of FIG. 3 according to one or more example embodiments.

FIG. 14 illustrates the first bank array and the first sense amplifier in the semiconductor memory device of FIG. 3 according to one or more example embodiments.

Referring to FIG. 14, in the first bank array 310a, I sub-array blocks SCB may be disposed in the first direction D1, and J sub-array blocks SCB may be disposed in the second direction D2 perpendicular to the first direction D1. I and J represent a number of the sub-array blocks SCB in the first direction D1 and the second direction D2, respectively, and are natural numbers greater than two.

I sub-array blocks SCB disposed in the first direction D1 in one row may be referred to as a row block. A plurality of bit-lines, a plurality of word-lines and a plurality of memory cells connected to the bit-lines and the word-lines are disposed in each of the sub-array blocks SCB.

I+1 sub word-line driver regions SWB may be disposed between the sub-array blocks SCB in the first direction D1 as well on each side of each of the sub-array blocks SCB in the first direction D1. Sub word-line drivers may be disposed in the sub word-line driver regions SWB. J+1 bit-line sense amplifier regions BLSAB may be disposed, for example, between the sub-array blocks SCB in the second direction D2 and above and below each of the sub-array blocks SCB in the second direction D2. Bit-line sense amplifiers to sense data stored in the memory cells may be disposed in the bit-line sense amplifier regions BLSAB.

A plurality of sub word-line drivers may be provided in each of the sub word-line driver regions SWB. One sub word-line driver region SWB may be associated with two sub-array blocks SCB adjacent to the sub word-line driver region SWB in the first direction D1.

A plurality of conjunction regions CONJ may be disposed adjacent the sub word-line driver regions SWB and the bit-line sense amplifier regions BLSAB. A voltage generator may be disposed in each of the conjunction regions CONJ.

The first sense amplifier 285a may be disposed in the first direction D1 with respect to the first bank array 310a and the first sense amplifier 285a may include I I/O sense amplifiers IOSAs 286a, 286b, . . . , 286i, I drivers DRVs 287a, 287b, . . . , 287i and a controller 289. The controller 289 may control the I I/O sense amplifiers 286a, 286b, . . . , 286i and the I drivers 287a, 287b, . . . , 287i by providing an enable signal IOSA_EN to the I I/O sense amplifiers 286a, 286b, . . . , 286i in a read operation and by providing a driving signal PDT to the I drivers DRVs 287a, 287b, . . . , 287i in a write operation.

A portion 390 in the first bank array 310a will be described with reference to FIG. 15 below.

Figure 15:
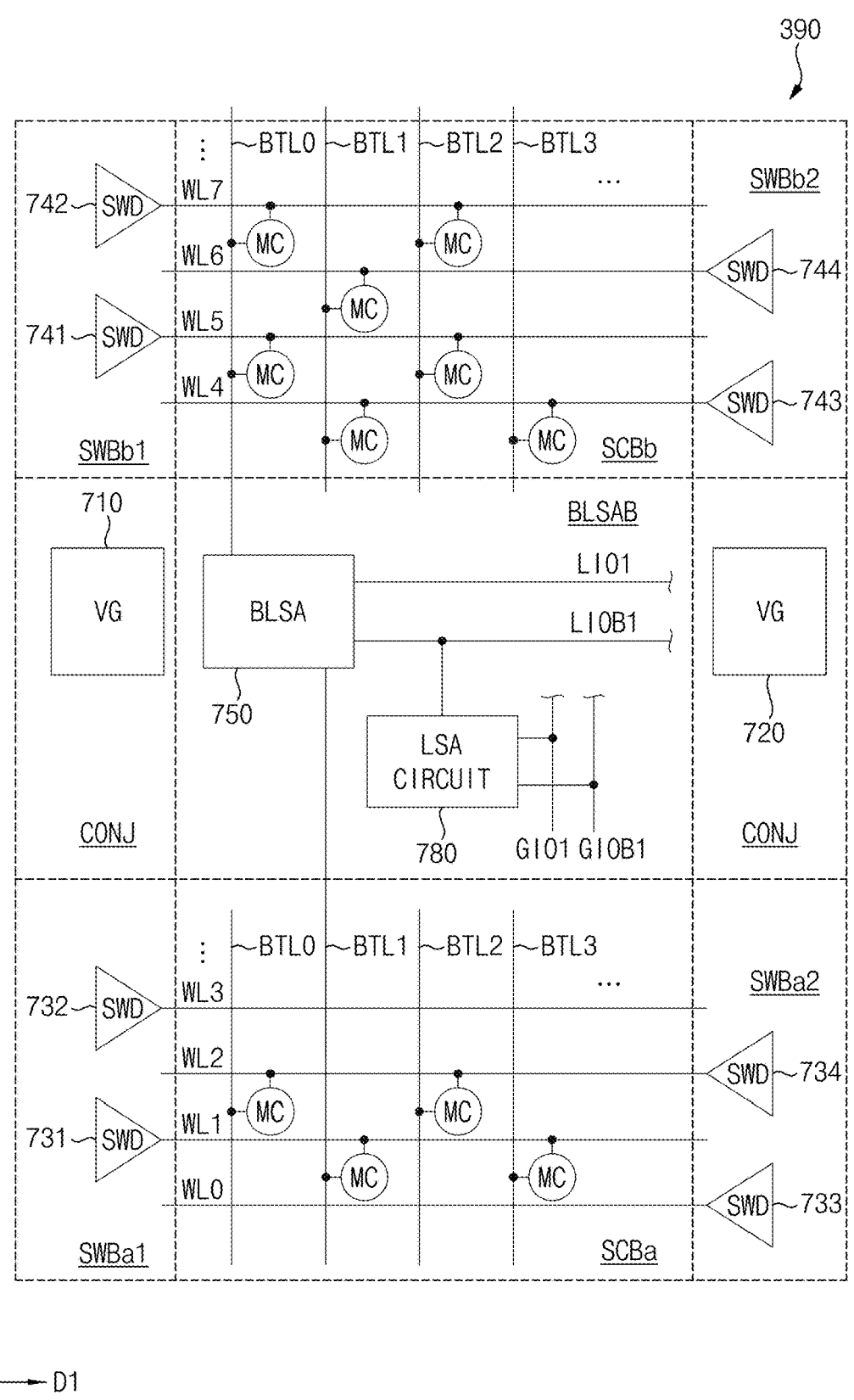
FIG. 15 illustrates a portion of the first bank array in FIG. 14 according to one or more example embodiments.

FIG. 15 illustrates a portion of the first bank array in FIG. 14 according to one or more example embodiments.

Referring to FIGS. 14 and 15, in the portion 390 of the first bank array 310a, sub-array blocks SCBa and SCBb, the bit-line sense amplifier regions BLSAB, four sub word-line driver regions SWBa1, SWBa2, SWBb1 and SWBb2 and two of the conjunction regions CONJ are disposed.

The sub-array block SCBa may include a plurality of word-lines WL0~WL3 extending in the second direction D2 and a plurality of bit-line BTL0~BTL3 extending in the first direction D1. The sub-array block SCBa may include a plurality of memory cells MCs disposed at intersections of the word-lines WL0~WL3 and the bit-line BTL0~BTL3. The sub-array block SCBb may include a plurality of word-lines WL4~WL7 extending in the second direction D2 and the plurality of bit-line BTL0~BTL3 extending in the first direction D1. The sub-array block SCBb may include a plurality of memory cells MCs disposed at intersections of the word-lines WL4~WL7 and the bit-line BTL0~BTL3.

With reference to FIG. 15, the sub word-line driver regions SWBa1 and SWBa2 may include a plurality of sub word-line drivers 731, 732, 733 and 734 that respectively drive the word-lines WL0~WL3. The sub word-line driver regions SWBb1 and SWBb2 may include a plurality of sub word-line drivers 741, 742, 743 and 744 that respectively drive the word-lines WL4~WL7.

The bit-line sense amplifier region BLSAB may include a bit-line sense amplifier BLSA 750 coupled to the bit-line BTL0 in the sub array block SCBb and the bit-line BTL1 in the sub array block SCBa, and a local sense amplifier LSA circuit 780. The bit-line sense amplifier 750 may sense and amplify a voltage difference between the bit-lines BTL0 and BTL1 to provide the amplified voltage difference to a local I/O line pair LIO1 and LIOB1.

The local sense amplifier circuit 780 may control electrical connection between the local I/O line pair LIO1 and LIOB1 and a global I/O line pair GIO1 and GIOB1.

As illustrated in FIG. 15, the conjunction regions CONJ may be disposed adjacent to the bit-line sense amplifier region BLSAB and the sub word-line driver regions SWBa1, SWBb1, SWBa2 and SWBb2. Voltage generators 710 and 720 may be disposed in the conjunction regions CONJ.

Figure 16:
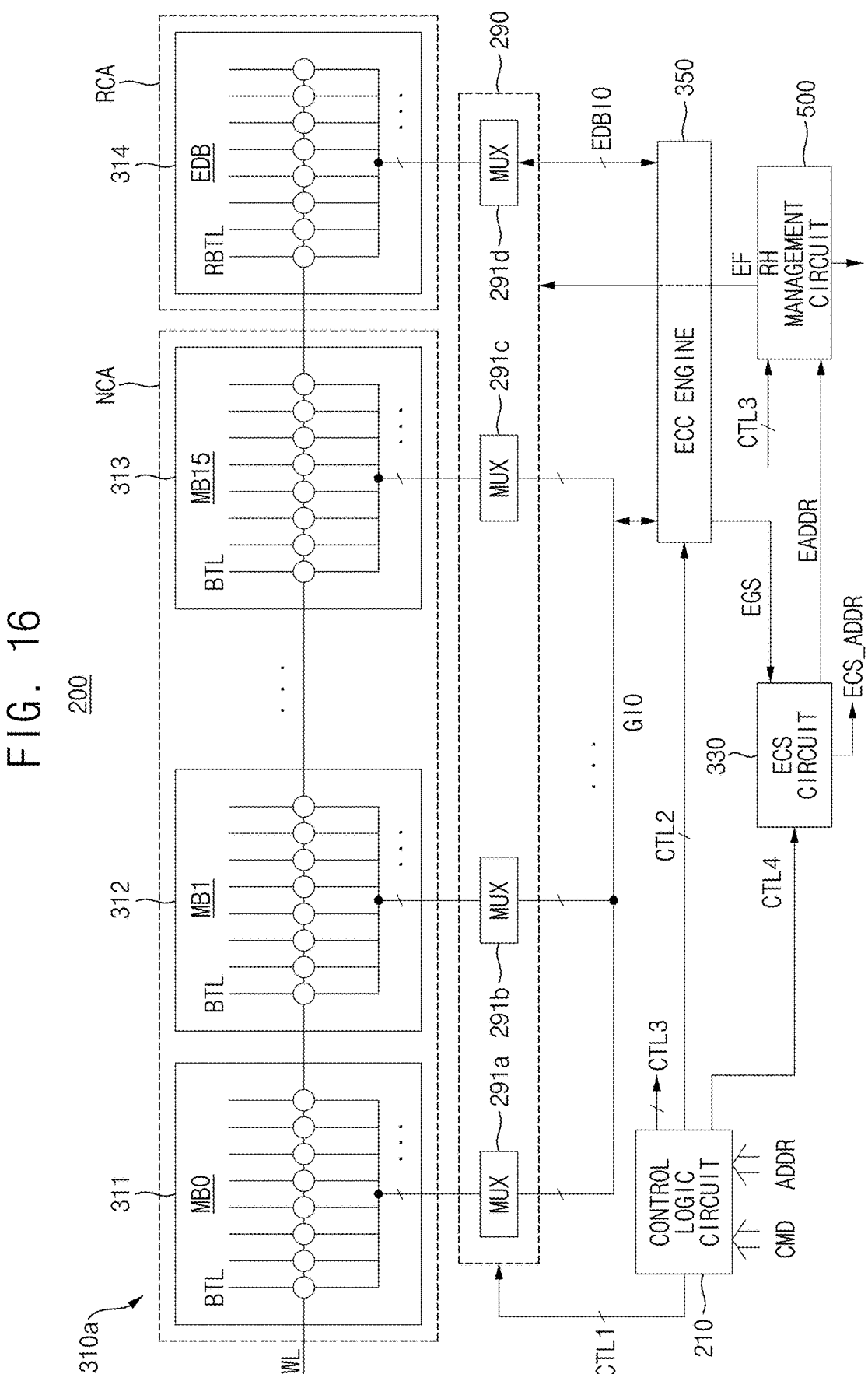
FIG. 16 illustrates a portion of the semiconductor memory device of FIG. 3 in the ECS mode.

FIG. 16 illustrates a portion of the semiconductor memory device of FIG. 3 in the ECS mode.

In FIG. 16, the control logic circuit 210, the first bank array 310a, the I/O gating circuit 290, the ECS circuit 330, the ECC engine 350 and the row hammer management circuit 500 are illustrated.

Referring to FIG. 16, the first bank array 310a includes a normal cell array NCA and a redundancy cell array RCA.

The normal cell array NCA includes a plurality of first memory blocks MB0, MB2~MB15, i.e., 311, 312~313, and the redundancy cell array RCA includes at least a second memory block 314. The first memory blocks 311, 312~313 are memory blocks that determine or are used to determine a memory capacity of the semiconductor memory device 200. The second memory block 314 is for ECC and/or redundancy repair. Since the second memory block 314 for ECC and/or redundancy repair is used for ECC, data line repair and block repair to repair 'failed' cells generated in the first memory blocks 311, 312~313, the second memory block 314 is also referred to as an (ECC repair, data line repair and block repair) EDB block. Each of the first memory blocks 311, 312~313 includes memory cells coupled to a word-line WL and bit-lines BTL and the second memory block 314 includes memory cells coupled to word-line WL and redundancy bit-lines RBTL. The first memory blocks 311, 312~313 and the second memory block 314 may each be representative of a sub array block SCB in FIG. 14. A portion of memory cells in the first memory blocks 311, 312~313 may be allocated as count cells.

The I/O gating circuit 290 includes a plurality of switching circuits 291a~291d respectively connected to the first memory blocks 311, 312~313 and the second memory block 314.

The ECC engine 350 may be connected to the switching circuits 291a~291d through first data lines GIO and second data lines EDBIO. The control logic circuit 210 may receive the command CMD and the address ADDR and may decode the command CMD to generate the first control signal CTL1 for controlling the switching circuits 291a~291d, the second control signal CTL2 for controlling the ECC engine 350, the third control signal CTL3 for controlling the row hammer management circuit 500 and the fourth control signal CTL4 for controlling the ECS circuit 330.

The ECS circuit 330 may generate the scrubbing address ECS_ADDR in the ECS mode and the ECC engine 350 may perform a scrubbing operation on a first memory cell row designated by the scrubbing address ECS_ADDR and may provide the ECS circuit 330 with the error generation signal EGS whenever an error bit is detected in the first memory cell row.

The ECS circuit 330 may provide the row hammer management circuit 500 with the scrubbing address ECS_ADDR as the error address EADDR based on the error generation signal EGS when a number of error bits detected by unit of codeword is equal to or greater than a reference error number.

The row hammer management circuit 500, in the ECS mode, may store the error flag EF with a first logic level in a portion of count cells to store count data, of each of one or more adjacent memory cell rows which are physically adjacent to a weak memory cell row corresponding to the error address from among the plurality of memory cell rows.

Figure 17:
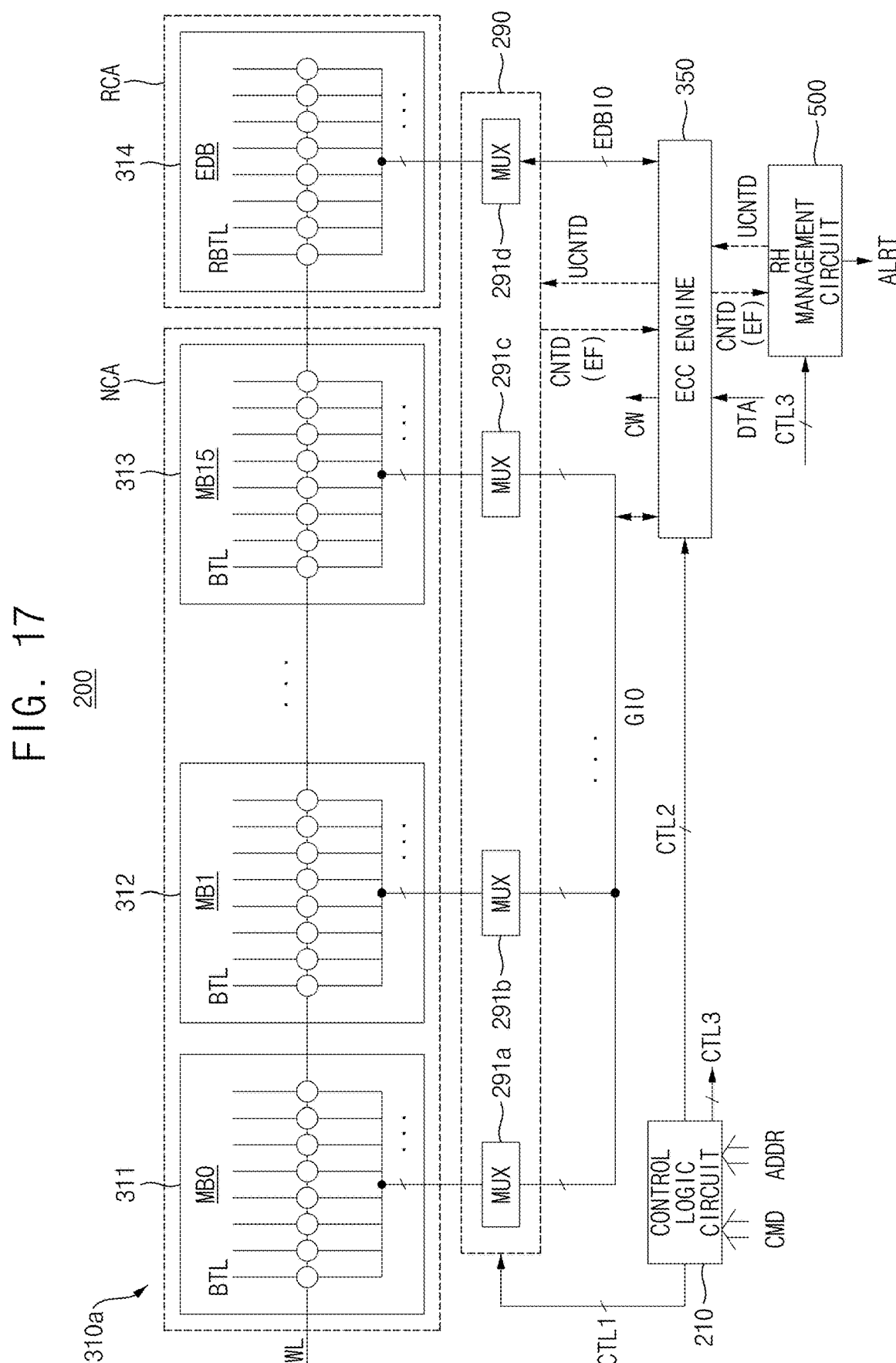
FIG. 17 illustrates a portion of the semiconductor memory device of FIG. 3 for explaining a write operation.

FIG. 17 illustrates a portion of the semiconductor memory device of FIG. 3 for explaining a write operation.

In FIG. 17, the control logic circuit 210, the first bank array 310a, the I/O gating circuit 290, the ECC engine 350 and the row hammer management circuit 500 are illustrated.

In FIG. 17, descriptions repeated with FIG. 16 will be omitted.

Referring to FIG. 17, when the command CMD is a write command, the control logic circuit 210 provides the second control signal CTL2 to the ECC engine 350. The ECC engine 350 performs the ECC encoding on the data DTA to generate parity data associated with the data DTA and provides the I/O gating circuit 290 with the codeword CW including the data DTA and the parity data. The control logic circuit 210 provides the first control signal CTL1 to the I/O gating circuit 290 such that the codeword CW is to be stored in a sub-page of the target page in the first bank array 310a.

When the command CMD that is received after the write command corresponds to the active count update command or a precharge command, the control logic circuit 210 provides the first control signal CTL1 to the I/O gating circuit 290 such that the I/O gating circuit 290 reads the count data CNTD, the error flag EF and a count parity data associated with the count data CNTD from the target page of the first bank array 310a and provides the count data CNTD, the error flag EF and the count parity data to the ECC engine 350. The ECC engine 350 performs an ECC decoding operation on the count data CNTD and the count parity data, corrects an error bit in the count data CNTD and provides the count data CNTD as a corrected count data to the row hammer management circuit 500, based on the second control signal CTL2.

The row hammer management circuit 500 updates the count data CNTD to provide the updated count data UCNTD to the ECC engine 350. The ECC engine 350 performs an ECC encoding on the updated count data UCNTD to generate updated count parity data and stores the updated count data UCNTD and the updated count parity data in the target page through the I/O gating circuit 290.

That is, the ECC engine 350 and row hammer management circuit 500 may perform the internal read-update-write operation to read the count data CNTD and the error flag EF, to update the read count data and to write the updated count data, in response to the active count update command. In addition, the row hammer management circuit 500, in response to all of the FIFO registers storing the candidate hammer addresses, each of whose number of times of access is equal to or greater than the first reference number of times NTH1 and the second reference number of times NTH2 based on the error flag EF, may notify the memory controller 30 of states of the FIFO registers by transiting a logic level of the alert signal ALRT from the second logic level to the first logic level.

Figure 18:
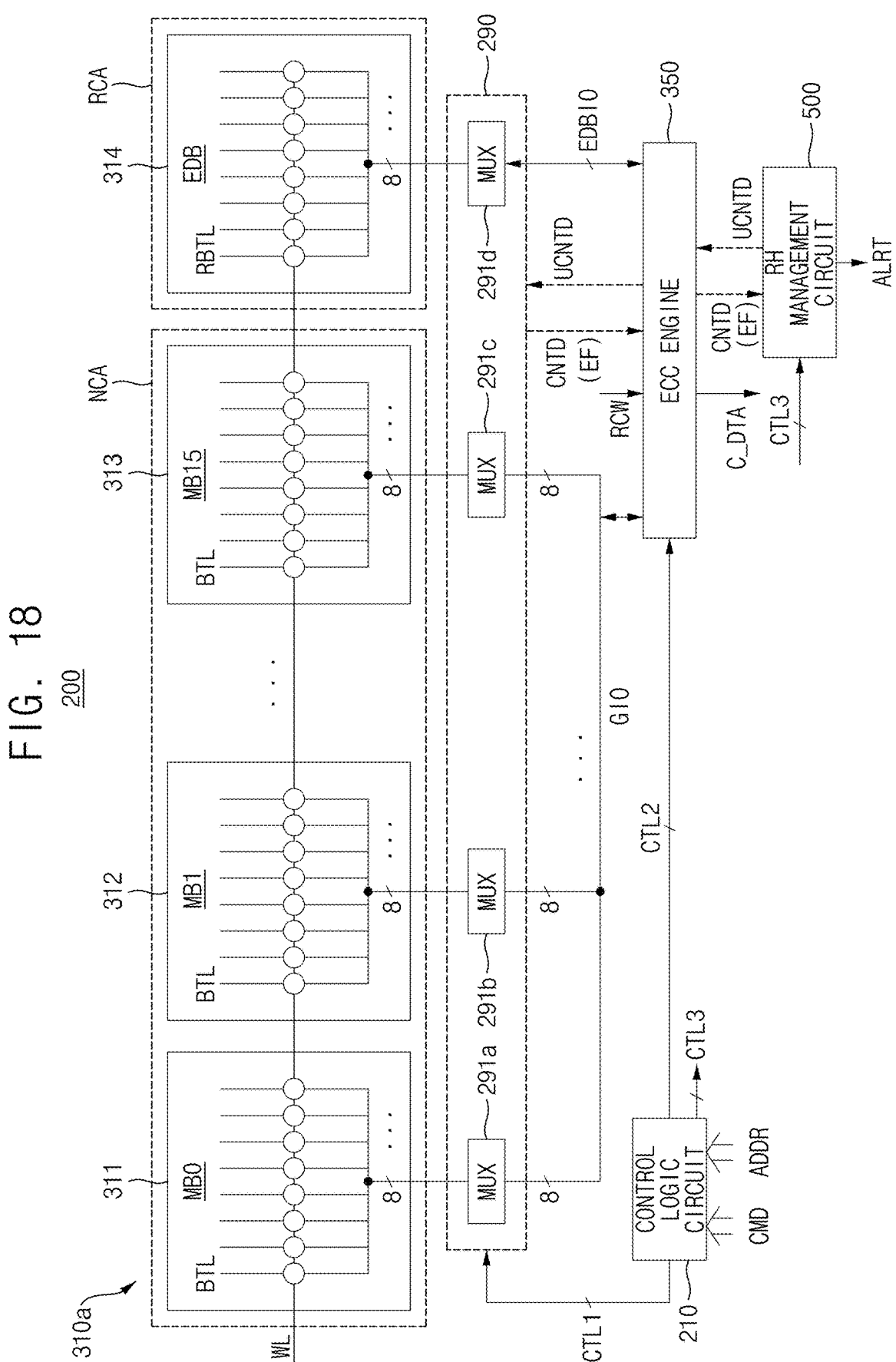
FIG. 18 illustrates a portion of the semiconductor memory device of FIG. 3 for explaining a read operation.

FIG. 18 illustrates a portion of the semiconductor memory device of FIG. 3 for explaining a read operation. Descriptions repeated with FIG. 17 will be omitted.

Referring to FIG. 18, when the command CMD is a read command to designate a read operation, the control logic circuit 210 provides the first control signal CTL1 to the I/O gating circuit 290 such that a (read) codeword RCW stored in the sub-page of the target page in the first bank array 310a is provided to the ECC engine 350.

When the command CMD that is received after the write command corresponds to the active count update command or the precharge command, the control logic circuit 210 provides the first control signal CTL1 to the I/O gating circuit 290 such that the I/O gating circuit 290 reads the count data CNTD, the error flag EF and a count parity data associated with the count data CNTD from the target page of the first bank array 310a and provides the count data CNTD, the error flag EF and the count parity data to the ECC engine 350. The ECC engine 350 performs an ECC decoding operation on the count data CNTD and the count parity data, corrects an error bit in the count data CNTD and provides the count data CNTD as a corrected count data to the row hammer management circuit 500, based on the second control signal CTL2.

The row hammer management circuit 500 updates the count data CNTD to provide the updated count data UCNTD to the ECC engine 350. The ECC engine 350 performs an ECC encoding on the updated count data UCNTD to generate updated count parity data and stores the updated count data UCNTD and the updated count parity data in the target page through the I/O gating circuit 290.

That is, the ECC engine 350 and row hammer management circuit 500 may perform the internal read-update-write operation to read the count data CNTD and the error flag EF, to update the read count data and to write the updated count data, in response to the active count update command or the precharge command. In addition, the row hammer management circuit 500, in response to all of the FIFO registers storing the candidate hammer addresses, each of whose number of times of access is equal to or greater than the first reference number of times NTH1 and the second reference number of times NTH2 based on the error flag EF, may notify the memory controller 30 of states of the FIFO registers by transiting a logic level of the alert signal ALRT from the second logic level to the first logic level.

Figure 19:
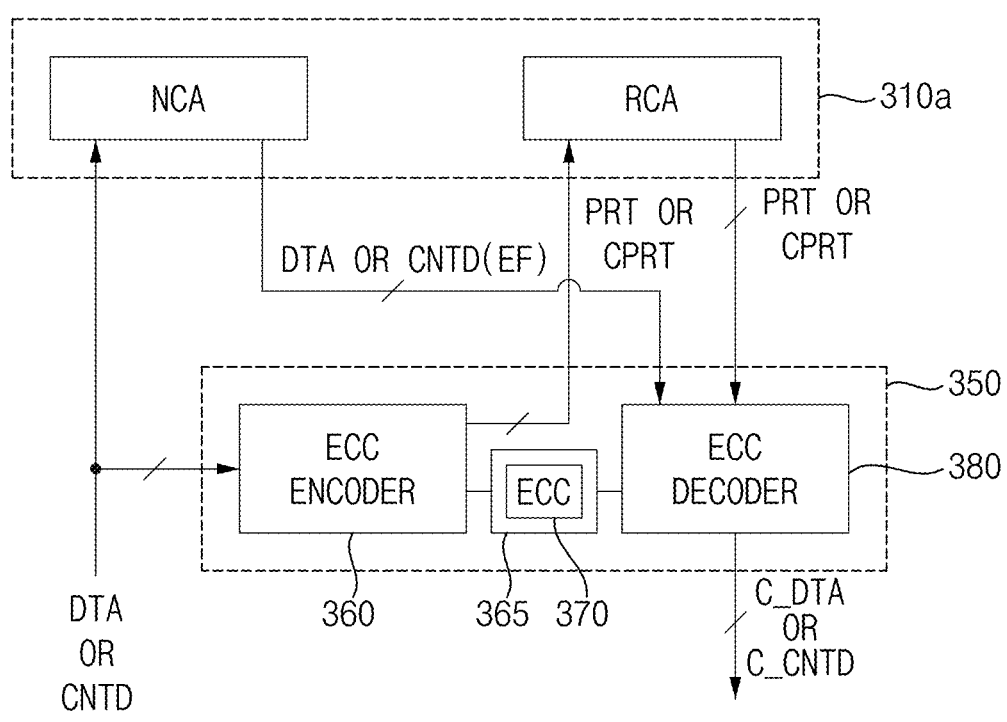
FIG. 19 is a block diagram illustrating an example of the ECC engine in the semiconductor memory device of FIG. 16, FIG. 17 or FIG. 18 according to one or more example embodiments.

FIG. 19 is a block diagram illustrating an example of the ECC engine in the semiconductor memory device of FIG. 16, FIG. 17 or FIG. 18 according to one or more example embodiments.

In FIG. 19, the first bank array 310a is also illustrated for convenience of explanation.

Referring to FIG. 19, the ECC engine 350 may include an ECC encoder 360, an ECC decoder 380 and a (ECC) memory 365. The memory 365 may store an ECC 370. The ECC 370 may be a single error correction (SEC) code or a single error correction/double error detection (SECDED) code.

The ECC encoder 360 may receive the data DTA from the data I/O buffer 320 and generate parity data PRT using the ECC 370, associated with the data DTA to be stored in the normal cell array NCA of the first bank array 310a. The parity data PRT may be stored in the redundancy cell array RCA of the first bank array 310a. In addition, the ECC encoder 360 may receive the count data CNTD as an updated count data UCNTD from the row hammer management circuit 500 and generate count parity data CPRT using the ECC 370, associated with the count data CNTD (i.e., updated count data UCNTD) to be stored in the normal cell array NCA of the first bank array 310a. The count parity data CPRT may be stored in the redundancy cell array RCA of the first bank array 310a.

The ECC decoder 380 may perform an ECC decoding operation on a read data DTA based on the read data DTA and the parity data PRT read from the first bank array 310a using the ECC 370. When the read data DTA includes an error bit as a result of the ECC decoding, the ECC decoder 380 may correct the error bit in the read data DTA and may provide a corrected data C_DTA to the data I/O buffer 320.

In addition, the ECC decoder 380 may perform an ECC decoding operation on the count data CNTD based on the count data CNTD and the count parity data CPRT read from the first bank array 310a using the ECC 370. When the count data CNTD includes an error bit as a result of the ECC decoding, the ECC decoder 380 may correct the error bit in the count data CNTD and may provide a corrected count data C_CNTD to the row hammer management circuit 500. When the count data CNTD is read from the count cells, the error flag EF may be read from the count cells.

Figure 20:
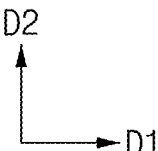
FIG. 20 is a block diagram illustrating an example of the first bank array in FIG. 3 according to one or more example embodiments.

FIG. 20 is a block diagram illustrating an example of the first bank array in FIG. 3 according to one or more example embodiments.

Referring to FIG. 20, a first bank array 310aa may include first sub array blocks SCA11 311a and 312a, second sub array blocks SCA12 313a and 314a, third sub array blocks SCA2 315a, I/O sense amplifiers 331, 332, 333, 334 and 336 and drivers 341, 342, 343, 344 and 346.

Data I/O for each of the first sub array blocks 311a and 312a and the second sub array blocks 313a and 314a may be performed through first global I/O lines GIO1<1:a> and first local I/O lines LIO1<1:a>. Here, a may be a natural number equal to or greater than 8. Depending on a read command or a write command, "a" bit-lines of each of the first sub array blocks 311a and 312a and the second sub array blocks 313a and 314a disposed in the first direction D1 may be selected by a column select signal transmitted through one of column select lines CSLs. The number of the first sub array blocks 311a and 312a and the second sub array blocks 313a and 314a may be different in other embodiments and, for example, may be determined depending on the number of bits of data the semiconductor memory device 200 is able to process.

Data I/O for the third sub array blocks 315a may be performed through second global I/O lines G1O2<1:b> and second local I/O lines LIO2<1:b>. Here, b may be a natural number smaller than a. Depending on a read command or a write command, "b" bit-lines of the third sub array blocks 315a may be selected by a column select signal that is transmitted through one of the column select lines CSLs. The number of the third sub array blocks 315a may be different in other embodiments.

In one or more example embodiments, the first bank array 310aa may further include first sub array blocks, second sub array blocks and third sub array blocks disposed in the second direction D2.

In one or more example embodiments, the first sub array blocks 311a and 312a may store normal data and the count data, the second sub array blocks 313a and 314a may store the normal data and the third sub array blocks 315a may store the parity data and the count parity data. The normal data may be, for example, data that the semiconductor memory device 200 receives from an external device or data that the semiconductor memory device 200 will provide to the external device.

The I/O sense amplifier 331 may sense and amplify voltages of the first global I/O lines GIO1<1:a>, which are determined depending on bits output through the first global I/O lines GIO1<1:a>. Each of the I/O sense amplifiers 332, 333, 334 and 336 may operate in a manner similar to the I/O sense amplifier 331. The I/O sense amplifier 336 may sense and amplify voltages of the second global I/O lines GIO2<1:b>, which are determined depending on bits output through the second global I/O lines GIO2<1:b>.

The driver 341 may provide data to memory cells of the first sub array blocks 313a through the first global I/O lines GIO1<1: a>, the first local I/O lines LIO1<1:a>, and "a" bit-lines selected by a column select signal transmitted through one of column select lines CSLs based on a write command. The data may include bits received through one data I/O pin, or may include bits received through a plurality of data I/O pins) aligned at a rising edge or a falling edge of a data strobe signal.

The drivers 342, 343, 344 and 346 may operate in a manner substantially similar to the driver 341. The driver 346 may transmit the parity data or the count parity data to memory cells of the third sub array blocks 315a through the second global I/O lines GIO2<1:b>, the second local I/O lines LIO2<1:b>, and "b" bit-lines selected by a column select signal transmitted through one of column select lines CSLs.

A portion of the first sub array blocks 311a and 312a, the second sub array blocks 313a and 314a and the third sub array block 315a may include count cells to store the count data CNTD and the error flag EF.

FIGS. 21 and 22 illustrate example commands which may be used in the memory system of FIG. 1.

FIG. 21 illustrates combinations of a chip selection signal CS_n and first through fourteenth command-address signals CA0~CA13 representing an active command ACT, a write command WR and a read command RD, and FIG. 22 illustrates combinations of the chip selection signal CS_n and the first through fourteenth command-address signals CA0~CA13 representing precharge commands PREab, PREsb and PREpb.

In FIGS. 21 and 22, H indicates a logic high level, L indicates a logic low level, V indicates a valid logic level corresponding to one of the logic high level H and the logic low level L, R0~R17 indicate bits of a row address, BA0, BA1 and BA2 indicate bits of a bank address, BG0, BG1 and BG2 indicate bits of a bank group address, and CID0, CID1, CID2 and CID3 indicate die identifier of a memory die (or a memory chip) when the semiconductor memory device 200 in FIG. 1 is implemented with a stacked memory device including a plurality of memory dies. In addition, in FIG. 21, C2~C10 indicate bits of a column address, and in FIG. 21, BL indicates burst length flag.

Referring to FIG. 21, the active command ACT, the write command WR and the read command RD may be transferred during two cycles, for example, during the logic high level H and the logic low level L of the chip selection signal CS_n. The active command ACT may include the bank address bits BA0 and BAL and the row address bits R0~R17.

In FIG. 22, PREpb is a precharge command to precharge a particular bank in a particular bank group, PREab is an all bank precharge command to precharge all banks in all bank groups and PREsb is a same bank precharge command to precharge the same bank in all bank groups.

Referring to FIG. 22, the ninth command-address signal CA8 or the tenth command-address signal CA9 of each of the precharge commands PREab and PREsb may be uses as an active count update flag designating the internal read-update-write operation.

Figure 23A:
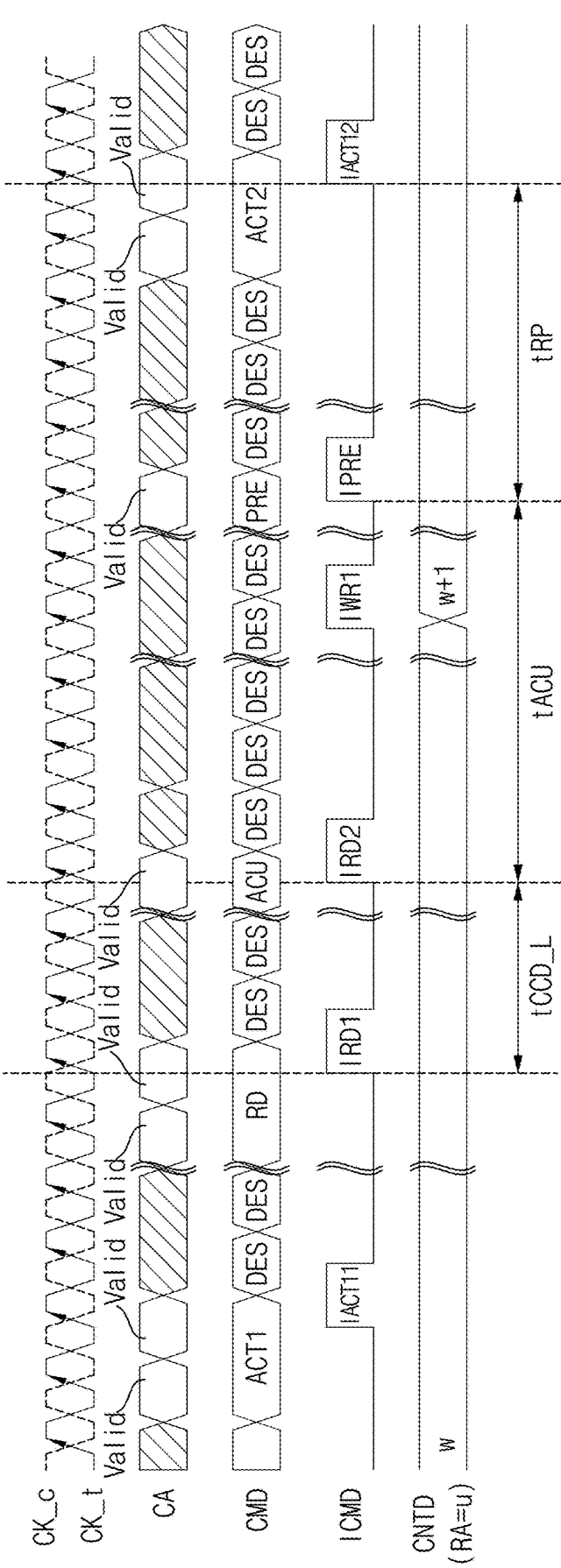
FIGS. 23A and 23B illustrate examples of command protocols of the memory system when the memory system uses the active count update command, respectively.
Figure 23B:
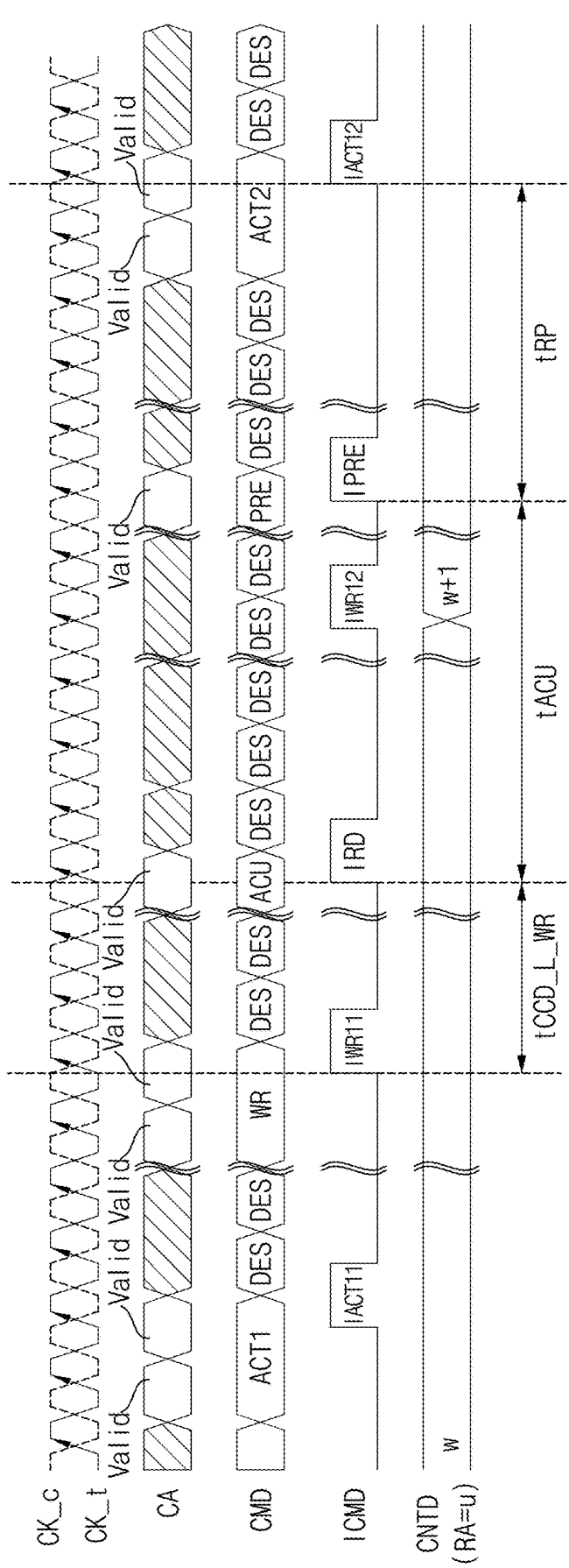

FIGS. 23A and 23B illustrate examples of command protocols of the memory system when the memory system uses the active count update command, respectively.

In FIGS. 23A and 23B, differential clock signal pair CK_t and CK_c are illustrated.

Referring to FIGS. 1, 2, 3 and 23A, the scheduler 55 applies a first active command ACT1 which is accompanied by a first target row address designating a first target memory cell row to the semiconductor memory device 200 in synchronization with an edge of the clock signal CK_t.

The control logic circuit 210, in response to the first active command ACT1, enables the first target word-line connected to the first target memory cell row by enabling a first active signal IACT11.

After applying the first active command ACT1, the scheduler 55 applies a read command RD designating a read operation on the first target memory cell row to the semiconductor memory device 200 in synchronization with an edge of the clock signal CK_t. The control logic circuit 210, in response to the read command RD, performs a read operation on data stored in the first target memory cell row by enabling a first read signal IRD1.

After a time interval corresponding to a delay time of consecutive read commands to the same bank group tCCD_L from applying the read command RD, the scheduler 55 applies an active count update command ACU to the semiconductor memory device 200 in synchronization with an edge of the clock signal CK_t and the control logic circuit 210 reads the count data CNTD from the first target memory cell row, updates the read count data CNTD and stores the updated count data in the first target memory cell row by sequentially enabling a second read signal IRD2 and a write signal IWR1 in response to the active count update command ACU. Therefore, bit values stored in the first target memory cell row designated by the first target row address (e.g., RA=u) is increased by one from w to w+1.

After a time interval corresponding to a time tACU of performing the internal read-update-write operation from applying the active count update command ACU, the scheduler 55 applies a precharge command PRE to the semiconductor memory device 200 and the control logic circuit 210, in response to the precharge command PRE, precharges the first target word-line by enabling a precharge signal IPRE.

After a time interval corresponding to precharge time tRP, the scheduler 55 applies a second active command ACT2 associated with a second target memory cell row to the semiconductor memory device 200 and the control logic circuit 210, in response to the second active command ACT2, enables a second target word-line connected to the second target memory cell row by enabling a second active signal IACT12.

Referring to FIGS. 1, 2, 3 and 23B, the scheduler 55 applies a first active command ACT1 which is accompanied by a first target row address designating a first target memory cell row to the semiconductor memory device 200 in synchronization with an edge of the clock signal CK_t.

The control logic circuit 210, in response to the first active command ACT1, enables the first target word-line connected to the first target memory cell row by enabling a first active signal IACT11.

After applying the first active command ACT1, the scheduler 55 applies a write command WR designating a write operation on the first target memory cell row to the semiconductor memory device 200 in synchronization with an edge of the clock signal CK_t. The control logic circuit 210, in response to the write command WR, performs a write operation to store data in the first target memory cell row by enabling a first write signal IWR11.

After a time interval corresponding to a delay time of consecutive write commands to the same bank group tCCD_L_WR from applying the write command WR, the scheduler 55 applies an active count update command ACU to the semiconductor memory device 200 in synchronization with an edge of the clock signal CK_t and the control logic circuit 210 reads the count data CNTD from the first target memory cell row, updates the read count data CNTD and stores the updated count data in the first target memory cell row by sequentially enabling a read signal IRD and a second write signal IWR12 in response to the active count update command ACU. Therefore, bit values stored in the first target memory cell row designated by the first target row address (e.g., RA=u) is increased by one from w to w+1.

After a time interval corresponding to a time tACU of performing the internal read-update-write operation from applying the active count update command ACU, the scheduler 55 applies a precharge command PRE to the semiconductor memory device 200 and the control logic circuit 210, in response to the precharge command PRE, precharges the first target word-line by enabling a precharge signal IPRE.

After a time interval corresponding to precharge time tRP, the scheduler 55 applies a second active command ACT2 associated with a second target memory cell row to the semiconductor memory device 200 and the control logic circuit 210, in response to the second active command ACT2, enables a second target word-line connected to the second target memory cell row by enabling a second active signal IACT12.

Figure 24A:
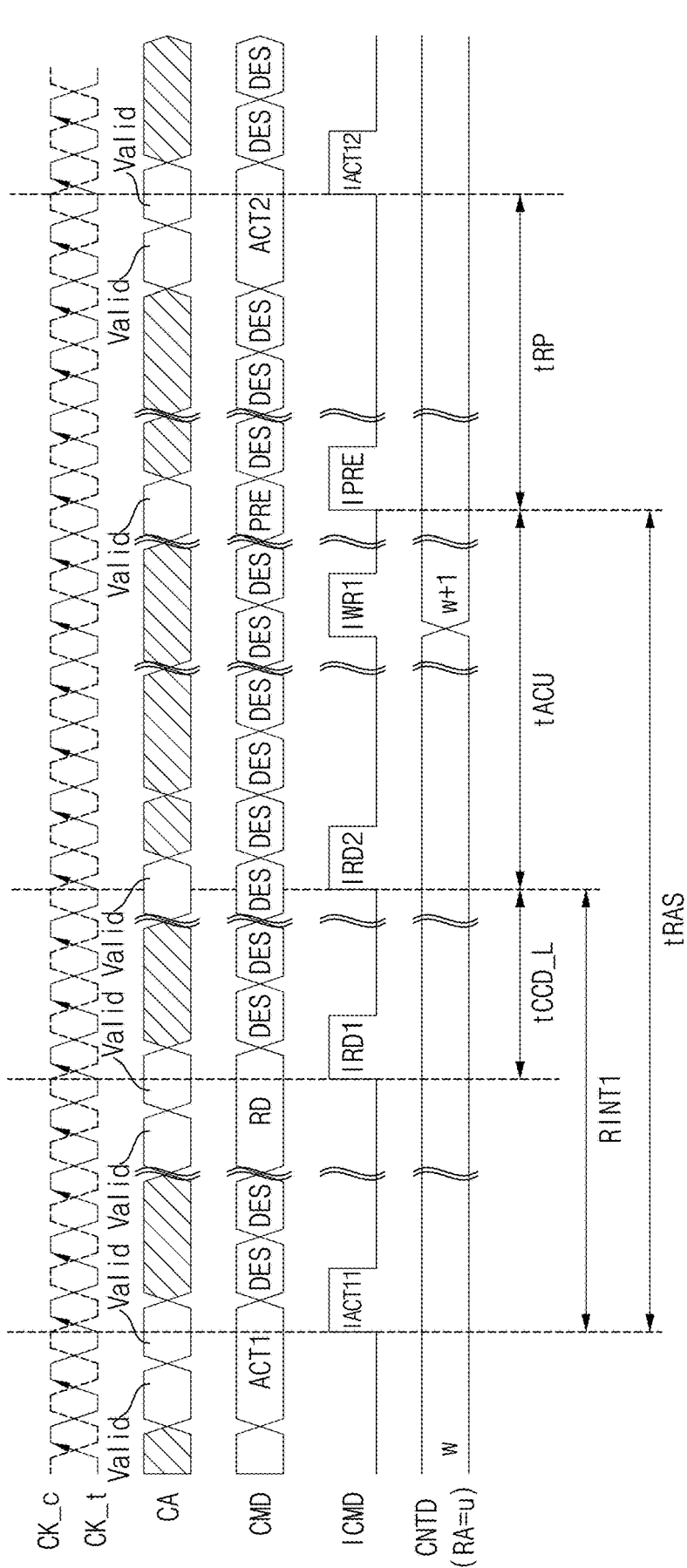
FIGS. 24A and 24B illustrate examples of command protocols of the memory system when the semiconductor memory device performs an active count update operation internally, respectively.
Figure 24B:
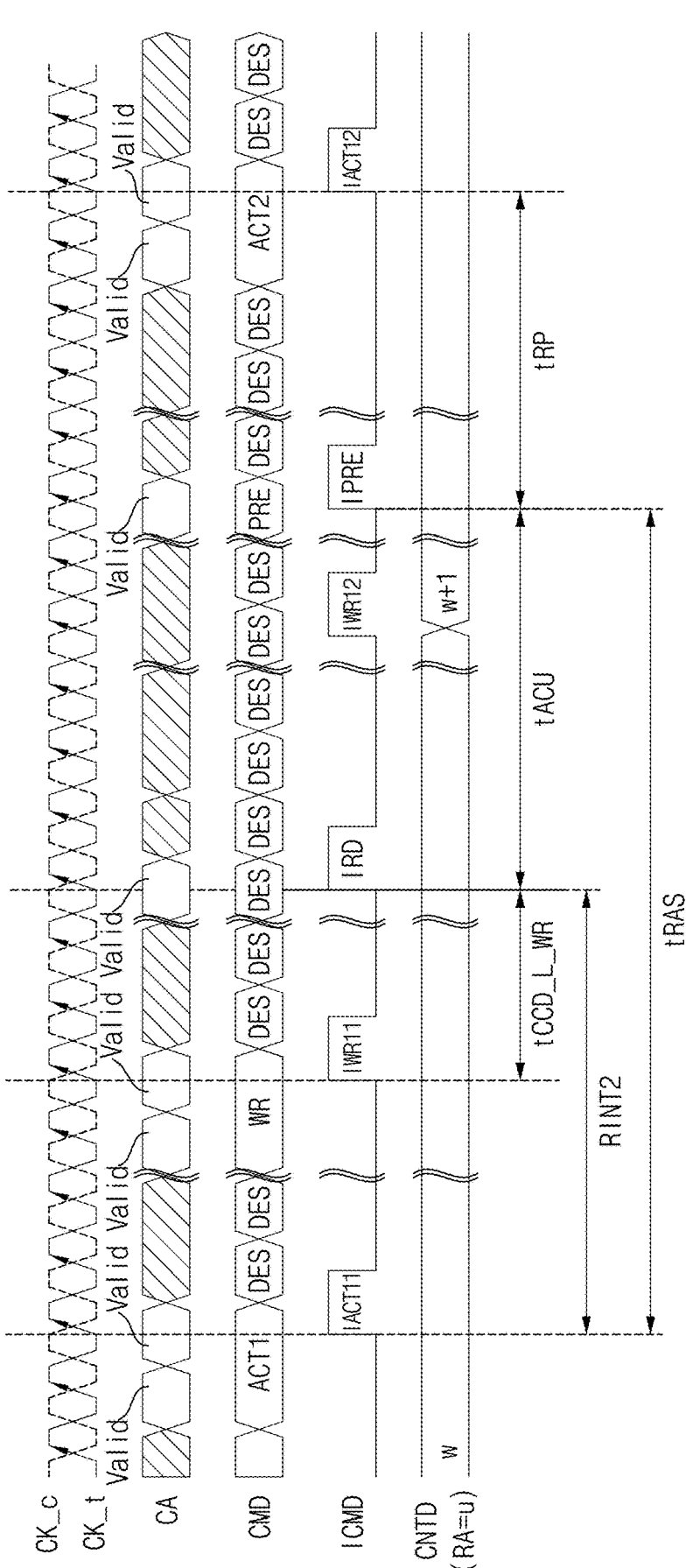

FIGS. 24A and 24B illustrate examples of command protocols of the memory system when the semiconductor memory device performs an active count update operation internally, respectively.

In FIGS. 24A and 24B, descriptions repeated with FIGS. 23A and 23B will be omitted.

Referring to FIG. 24A, after applying the first active command ACT1, the scheduler 55 applies a read command RD designating a read operation on the first target memory cell row to the semiconductor memory device 200 in synchronization with an edge of the clock signal CK_t. The control logic circuit 210, in response to the read command RD, performs a read operation on data stored in the first target memory cell row by enabling a first read signal IRD1.

In response to a reference time interval RINT1 elapsing from a time point at which the semiconductor memory device 200 receives the first active command, the control logic circuit 210 reads the count data CNTD from the first target memory cell row, updates the read count data CNTD and stores the updated count data in the first target memory cell row by sequentially enabling a second read signal IRD2 and a write signal IWR1. Therefore, bit values stored in the first target memory cell row designated by the first target row address (e.g., RA=u) is increased by one from w to w+1.

The control logic circuit 210 may determines that the reference time interval RINT1 elapses from the time point at which the semiconductor memory device 200 receives the first active command by counting the clock signal CK.

The semiconductor memory device 200 may perform the internal read-update-write operation internally with a tRAS corresponding to active to precharge time.

Referring to FIG. 24B, after applying the first active command ACT1, the scheduler 55 applies a write command WR designating a write operation on the first target memory cell row to the semiconductor memory device 200 in synchronization with an edge of the clock signal CK_t. The control logic circuit 210, in response to the write command WR, performs a write operation to store data in the first target memory cell row by enabling a first write signal IWR11.

In response to a reference time interval RINT2 elapsing from a time point at which the semiconductor memory device 200 receives the first active command, the control logic circuit 210 reads the count data CNTD from the first target memory cell row, updates the read count data CNTD and stores the updated count data in the first target memory cell row by sequentially enabling a second read signal IRD2 and a write signal IWR1. Therefore, bit values stored in the first target memory cell row designated by the first target row address (e.g., RA=u) is increased by one from w to w+1.

The control logic circuit 210 may determines that the reference time interval RINT2 elapses from the time point at which the semiconductor memory device 200 receives the first active command by counting the clock signal CK.

The semiconductor memory device 200 may perform the internal read-update-write operation internally with a tRAS corresponding to active to precharge time.

Figure 25A:
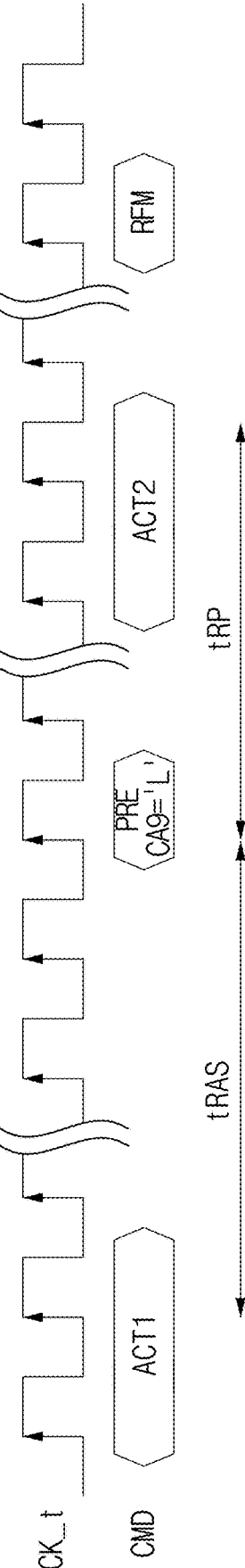
FIG. 25A illustrates an example of the command protocol of the memory system when the memory system updates the count data based on the precharge command.

FIG. 25A illustrates an example of the command protocol of the memory system when the memory system updates the count data based on the precharge command.

Referring to FIGS. 1, 2, 22 and 25A, the scheduler 55 applies the first active command ACT1 to the semiconductor memory device 200 in synchronization with an edge of the clock signal CK_t, and applies the precharge command PRE designating an internal read-update-write operation on the count data stored in a target memory cell designated by a target row address accompanied by the first active command ACT1 to the semiconductor memory device 200 after a tRAS corresponding to active to precharge time elapses. In this case, the scheduler 55 may set the tenth command-address signal CA9 of the precharge command PRE to a logic low level L.

After a time interval corresponding to precharge time tRP, the scheduler 55 applies a second active command ACT2 to the semiconductor memory device 200 in synchronization with an edge of the clock signal CK_t and applies a refresh management command RFM to the semiconductor memory device 200. The semiconductor memory device 200 performs a hammer refresh operation two victim memory cell rows physically adjacent to a memory cell row corresponding to the hammer address, in response to the refresh management command RFM.

Figure 25B:
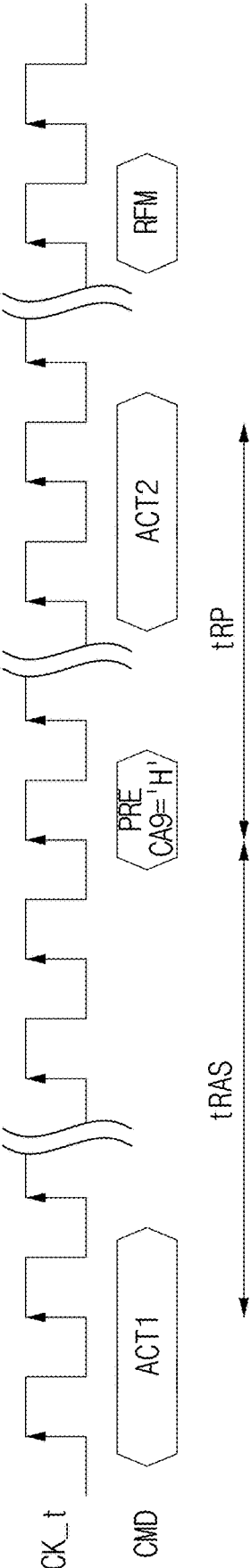
FIG. 25B illustrates an example of the command protocol of the memory system when the semiconductor memory device updates the count data within active to precharge time.

FIG. 25B illustrates an example of the command protocol of the memory system when the semiconductor memory device updates the count data within active to precharge time.

Referring to FIGS. 1, 2, 22 and 25B, the scheduler 55 applies the first active command ACT1 to the semiconductor memory device 200 in synchronization with an edge of the clock signal CK_t, and the and semiconductor memory device 200 performs an internal read-update-write operation on the count data stored in a target memory cell designated by a target row address accompanied by the first active command ACT1 within tRAS corresponding to active to precharge time elapses. In this case, the scheduler 55 may set the tenth command-address signal CA9 of the precharge command PRE to a logic high level H.

After a time interval corresponding to precharge time tRP, the scheduler 55 applies a second active command ACT2 to the semiconductor memory device 200 in synchronization with an edge of the clock signal CK_t and applies a refresh management command RFM to the semiconductor memory device 200. The semiconductor memory device 200 performs a hammer refresh operation two victim memory cell rows physically adjacent to a memory cell row corresponding to the hammer address, in response to the refresh management command RFM.

Figure 26:
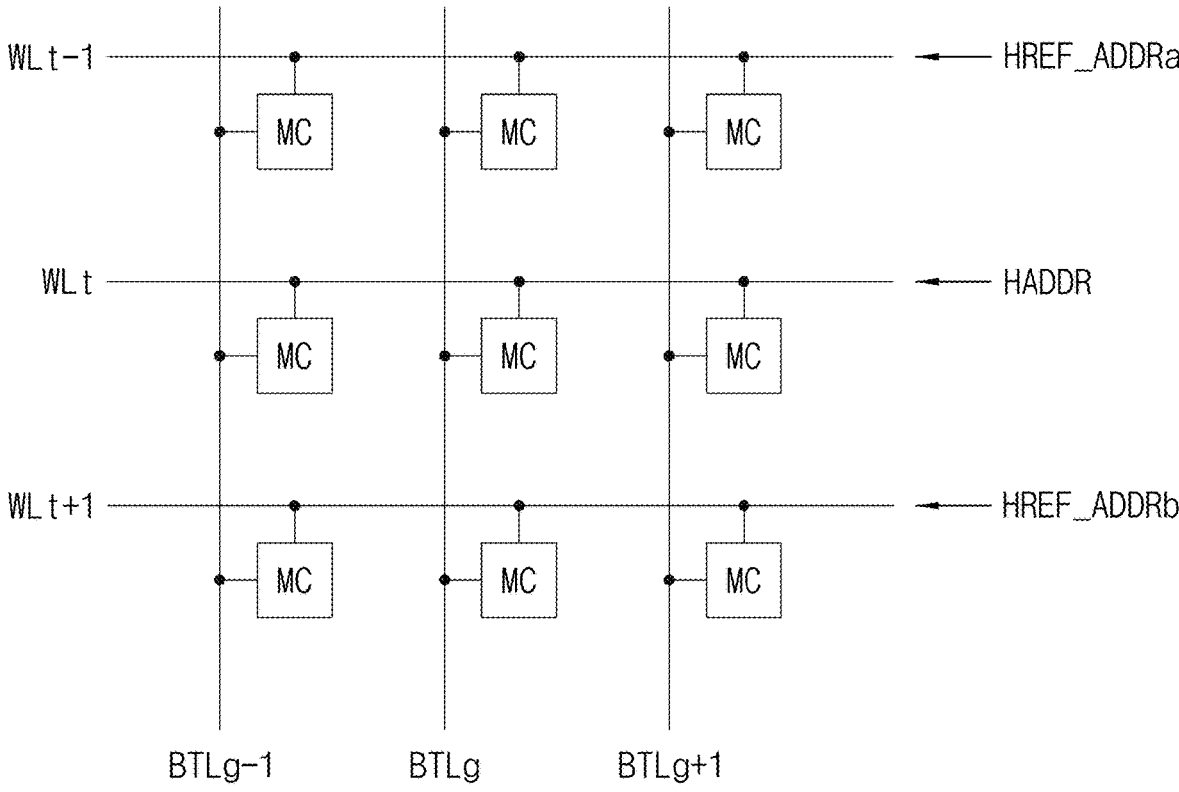
FIG. 26 is a diagram illustrating a portion of a memory cell array for describing generation of hammer refresh addresses.
Figure 26:
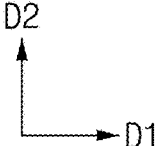

FIG. 26 is a diagram illustrating a portion of a memory cell array for describing generation of hammer refresh addresses.

FIG. 26 illustrates three word-lines WLt−1, WLt and WLt+1, three bit-lines BTLg−1, BTLg and BTLg+1 and memory cells MC coupled to the word-lines WLt−1, WLt and WLt+1 and the bit-lines BTLg−1, BTLg and BTLg+1 in the memory cell array. The three word-lines WLt−1, WLt and WLt+1 are extended in the first direction D1 and arranged sequentially along the second direction D2. The three bit-lines BTLg−1, BTLg and BTLg+1 are extended in the second direction D2 and arranged sequentially along the first direction D1. It will be understood that the word-lines WLt−1 and WLt are physically directly adjacent to each other since there are no intervening word-lines between the word-lines WLt−1 and WLt.

For example, the middle word-line WLt may correspond to the hammer address HADDR that has been intensively accessed. It will be understood that "an intensively-accessed word-line" refers to a word-line that has a relatively higher activation number and/or has a relatively higher activation frequency. Whenever the hammer word-line (e.g., the middle word-line WLt) is accessed, the hammer word-line WLt is enabled and precharged, and the voltage level of the hammer word-line WLt is increased and decreased. Word-line coupling may cause the voltage levels of the adjacent word-lines WLt−1 and WLt+1 to fluctuate as the voltage level of the hammer word-line WLt varies, and thus the cell charges of the memory cells MC coupled to the adjacent word-lines WLt−1 and WLt+1 may be affected. As the hammer word-line WLt is accessed more frequently, the cell charges of the memory cells MC coupled to the adjacent word-lines WLt−1 and WLt+1 may be lost more rapidly.

The hammer refresh address generator 440 in FIG. 6 may provide the hammer refresh address HREF_ADDR representing the addresses HREF_ADDRa and HREF_ADDRb of the rows (e.g., the word-lines WLt−1 and WLt+1) that are physically adjacent to the row of the hammer address HADDR (e.g., the hammer word-line WLt), and an refresh operation for the adjacent word-lines WLt−1 and WLt+1 may be performed additionally based on (e.g., in response to) the hammer refresh address HREF_ADDR to reduce or possibly prevent the loss of data stored in the memory cells MC.

Figure 27:
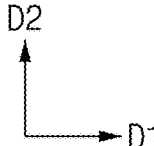
FIG. 27 is a diagram illustrating a portion of a memory cell array for describing generation of hammer refresh addresses in response to the second type of hammer address.

FIG. 27 is a diagram illustrating a portion of a memory cell array for describing generation of hammer refresh addresses in response to the second type of hammer address.

FIG. 27 illustrates five word-lines WLt−2, WLt−1, WLt, WLt+1 and WLt+2, three bit-lines BTLg−1, BTLg and BTLg+1 and memory cells MC coupled to the word-lines WLt−2, WLt−1, WLt, WLt+1 and WLt+2 and the bit-lines BTLg−1, BTLg and BTLg+1 in the memory cell array. The five word-lines WLt−2, WLt−1, WLt, WLt+1 and WLt+2 are extended in the first direction D1 and arranged sequentially along the second direction D2.

The hammer refresh address generator 440 in FIG. 6 may provide the hammer refresh address HREF_ADDR representing addresses HREF_ADDRa, HREF_ADDRb, HREF_ADDRc and HREF_ADDRd of the rows (e.g., the word-lines WLt−1, WLt+1, WLt−2 and WLt+2) that are physically adjacent to the row of the hammer address HADDR (e.g., the middle word-line WLt), and an refresh operation for the adjacent word-lines WLt−1, WLt+1, WLt−2 and WLt+2 may be performed additionally based on (e.g., in response to) the hammer refresh address HREF_ADDR to reduce or possibly prevent the loss of data stored in the memory cells MC.

Figure 28A:
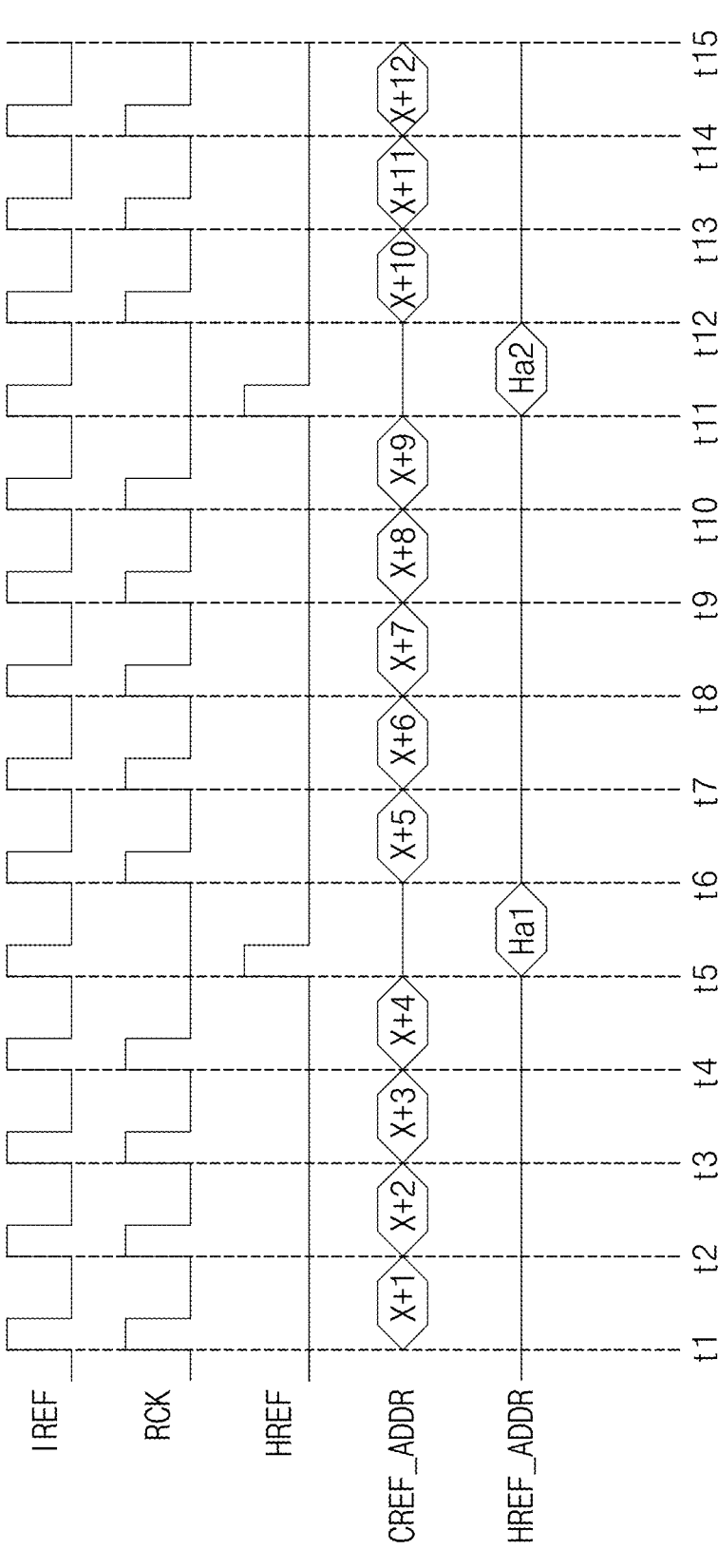
FIGS. 28A, 28B and 29 are timing diagrams illustrating example operations of a refresh control circuit of FIG. 6 according to one or more example embodiments.
Figure 28B:
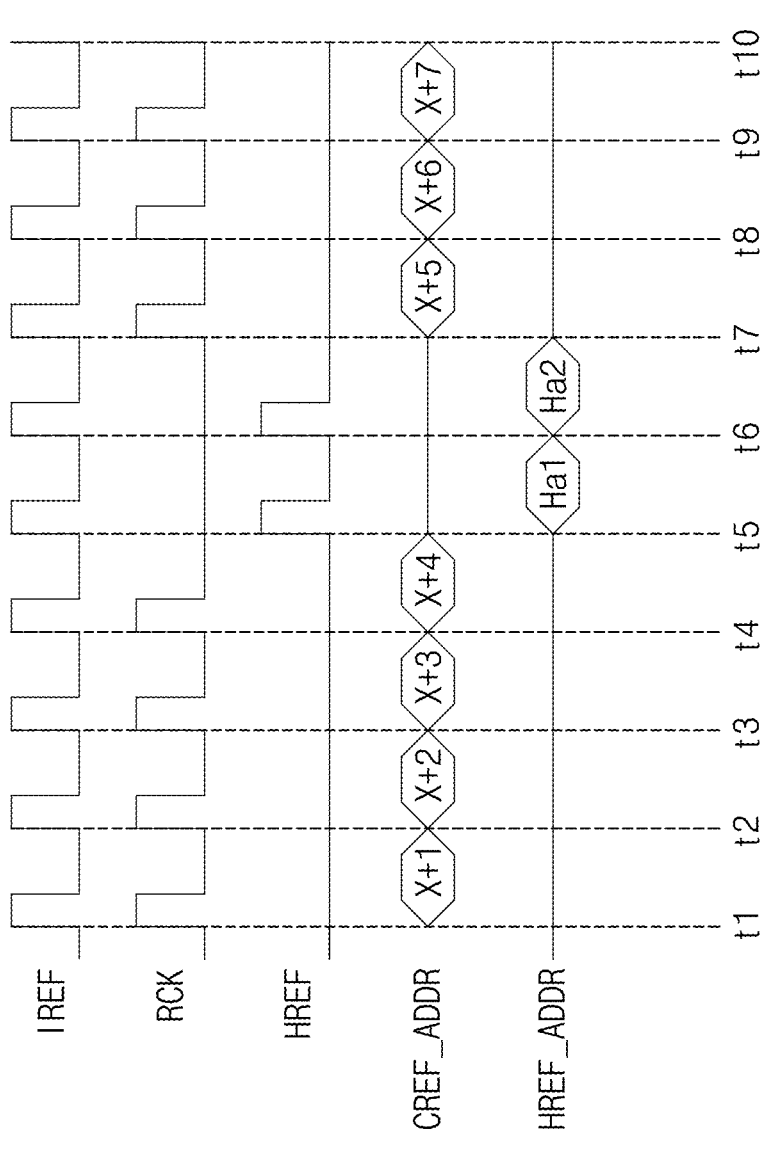
Figure 29:
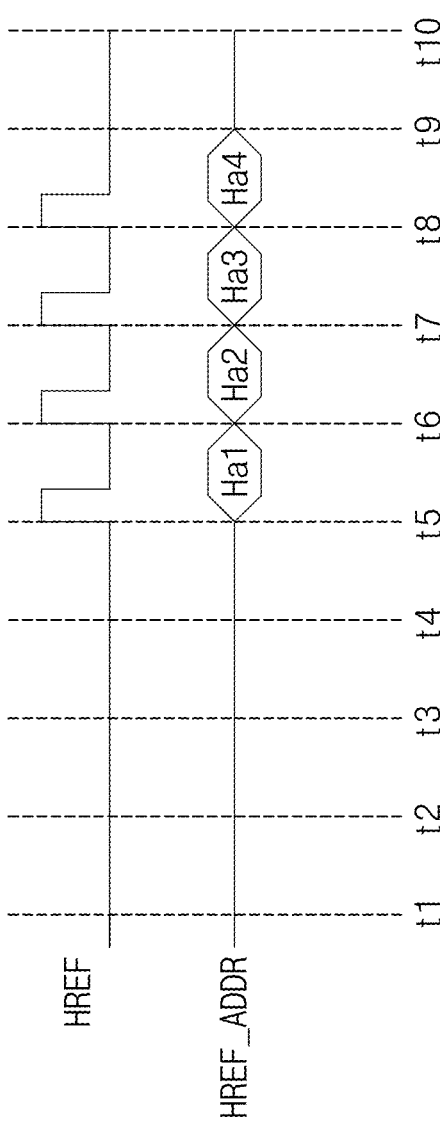

FIGS. 28A, 28B and 29 are timing diagrams illustrating example operations of a refresh control circuit of FIG. 6 according to one or more example embodiments.

FIGS. 28A and 28B illustrate generations of a refresh clock signal RCK, a hammer refresh signal HREF, a counter refresh address CREF_ADDR, and a hammer refresh address HREF_ADDR, with respect to a refresh control signal IREF that is activated in a pulse shape at activation time points t1~t15 or at activation time points t1~t10. The intervals between the activation time points t1~t15 or the activation time points t1~t10 of the refresh control signal IREF may be regular or irregular.

Referring to FIGS. 6 and 28A, the refresh control logic 410 may activate the refresh clock signal RCK in synchronization with some time points t1~t4, t6~t10 and t12~t14 among the activation time points t1~t15 of the refresh control signal IREF, and may activate the hammer refresh signal HREF with the other time points t5 and t11.

The refresh counter 430 may generate the counter refresh address CREF_ADDR representing the sequentially changing addresses X+1~X+12 in synchronization with the activation time points t1~t4, t6~t10 and t12~t14 of the refresh clock signal RCK. The hammer refresh address generator 440 may generate the hammer refresh address HREF_ADDR representing the address Ha1 and Ha2 of the rows that are physically adjacent to the row of the hammer address in synchronization with the activation time points t5 and t11 of the hammer refresh signal HREF.

Referring to FIGS. 6 and 28B, the refresh control logic 410 may activate the refresh clock signal RCK in synchronization with some time points t1~t4 and t7~t9 among the activation time points t1~t10 of the refresh control signal IREF, and may activate the hammer refresh signal HREF with the other time points t5 and t6.

The refresh counter 430 may generate the counter refresh address CREF_ADDR representing the sequentially changing addresses X+1~X+7 in synchronization with the activation time points t1~t4 and t7~t9 of the refresh clock signal RCK. The hammer refresh address generator 440 may generate the hammer refresh address HREF_ADDR representing the address Ha1 and Ha2 of the rows that are physically adjacent to the row of the hammer address in synchronization with the activation time points t5 and t6 of the hammer refresh signal HREF.

Referring to FIGS. 6 and 29, the hammer refresh address generator 440 may generate the hammer refresh address HREF_ADDR representing the address Ha1, Ha2, Ha3 and Ha4 of the rows that are physically adjacent to the row of the hammer address in synchronization with the activation time points t5, t6, t7 and t8 of the hammer refresh signal HREF.

Figure 30:
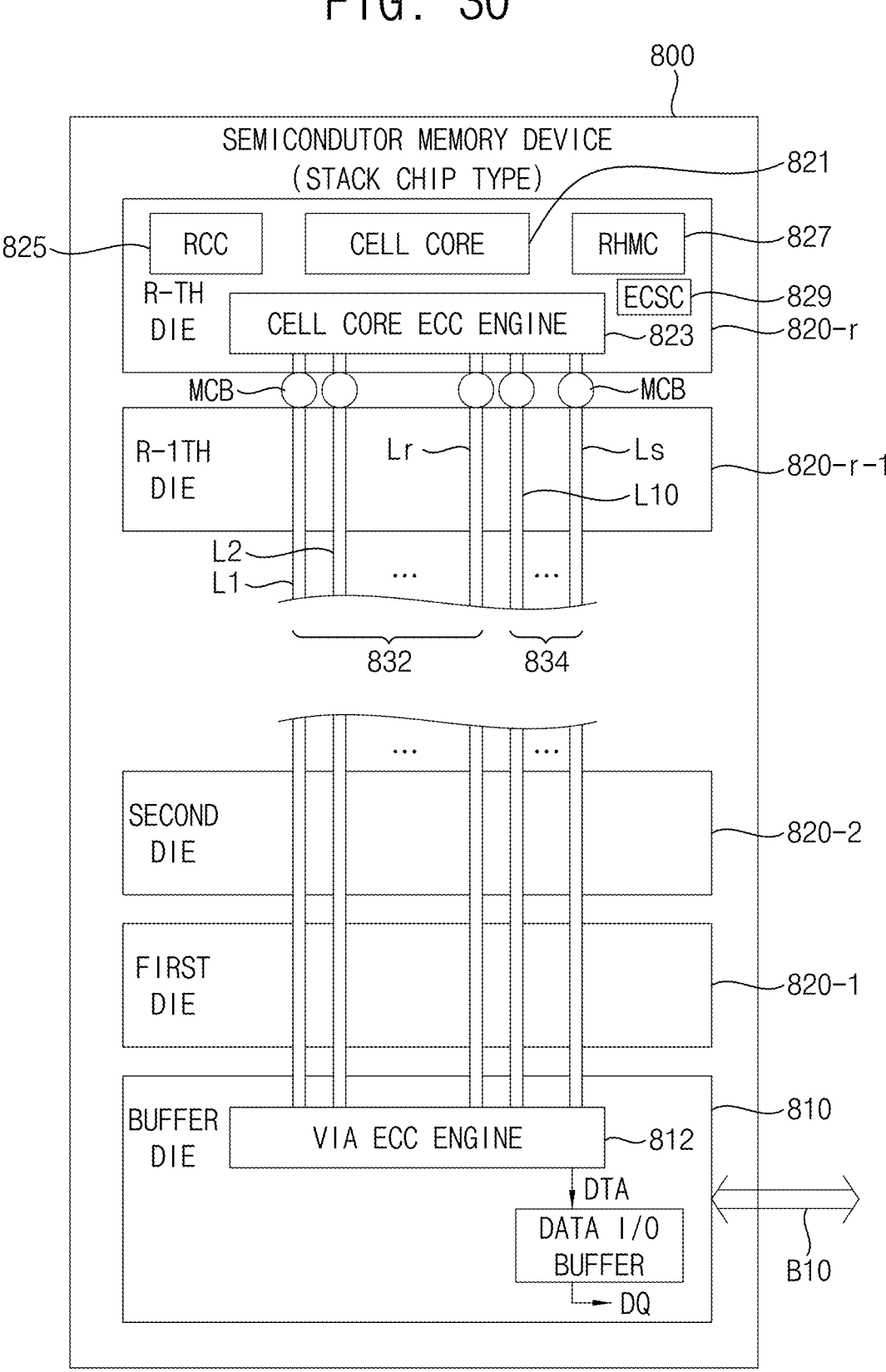
FIG. 30 is a block diagram illustrating a semiconductor memory device according to one or more example embodiments.

FIG. 30 is a block diagram illustrating a semiconductor memory device according to one or more example embodiments.

Referring to FIG. 30, a semiconductor memory device 800 may include at least one buffer die 810 and a plurality of memory dies 820-1 to 820-r (r is a natural number equal to or greater than three) providing a soft error analyzing and correcting function in a stacked chip structure.

The plurality of memory dies 820-1 to 820-r are stacked on the buffer die 810 and conveys data through a plurality of through silicon via (TSV) lines.

Each of the plurality of memory dies 820-1 to 820-r may include a cell core 821 to store data, a cell core ECC engine 823 which generates transmission parity bits (i.e., transmission parity data) based on transmission data to be sent to the at least one buffer die 810, a refresh control circuit (RCC) 825, and ECS circuit (ECSC) 829 and a row hammer management circuit (RHMC) 827. The cell core 821 may include a plurality of memory cells having DRAM cell structure.

The refresh control circuit 825 may employ the refresh control circuit 400 of FIG. 6, the row hammer management circuit 827 may employ the row hammer management circuit 500 of FIG. 9 and the ECS circuit 829 may employ the ECS circuit 330 of FIG. 5.

The ECS circuit 829 may provide the error address to the row hammer management circuit 827 based on an error generation signal in the ECS mode, and the row hammer management circuit 827 in the ECS mode, store an error flag with a first logic level in a portion of count cells to store count data, of each of one or more adjacent memory cell rows which are physically adjacent to a weak memory cell row corresponding to the error address and may, in a normal mode, may determine a hammer address by comparing the count data read count cells of a target memory cell row with difference reference number of times based on a logic level of the error flag. The refresh control circuit 825 may receive the hammer address from the row hammer management circuit 827 and may perform a hammer refresh operation on one or more victim memory cell rows physically adjacent to a memory cell row corresponding to the hammer address.

The buffer die 810 may include a via ECC engine 812 which corrects a transmission error using the transmission parity bits when a transmission error is detected from the transmission data received through the TSV liens and generates error-corrected data.

The buffer die 810 may further include a data I/O buffer 816. The data I/O buffer 816 may generate the data signal DQ by sampling the data DTA from the via ECC engine 812 and may output the data signal DQ to an outside.

The semiconductor memory device 800 may be a stack chip type memory device or a stacked memory device which conveys data and control signals through the TSV lines. The TSV lines may be also called 'through electrodes'.

The cell core ECC engine 823 may perform error correction on data which is outputted from the memory die 820-p before the transmission data is sent.

A data TSV line group 832 which is formed at one memory die 820-p may include TSV lines L1, L2, . . . , Lr, and a parity TSV line group 834 may include TSV lines L10 to Ls. The TSV lines L1, L2, . . . , Lr of the data TSV line group 832 and the parity TSV lines L10 to Ls of the parity TSV line group 834 may be connected to micro bumps MCB which are correspondingly formed among the memory dies 820-1 to 820-p.

The semiconductor memory device 800 may have a three-dimensional (3D) chip structure or a 2.5D chip structure to communicate with the host through a data bus B10. The buffer die 810 may be connected with the memory controller through the data bus B10.

According to one or more example embodiments, as illustrated in FIG. 30, the cell core ECC engine 823 may be included in the memory die, the via ECC engine 812 may be included in the buffer die. Accordingly, it may be possible to detect and correct soft data fail. The soft data fail may include a transmission error which is generated due to noise when data is transmitted through TSV lines.

Figure 31:
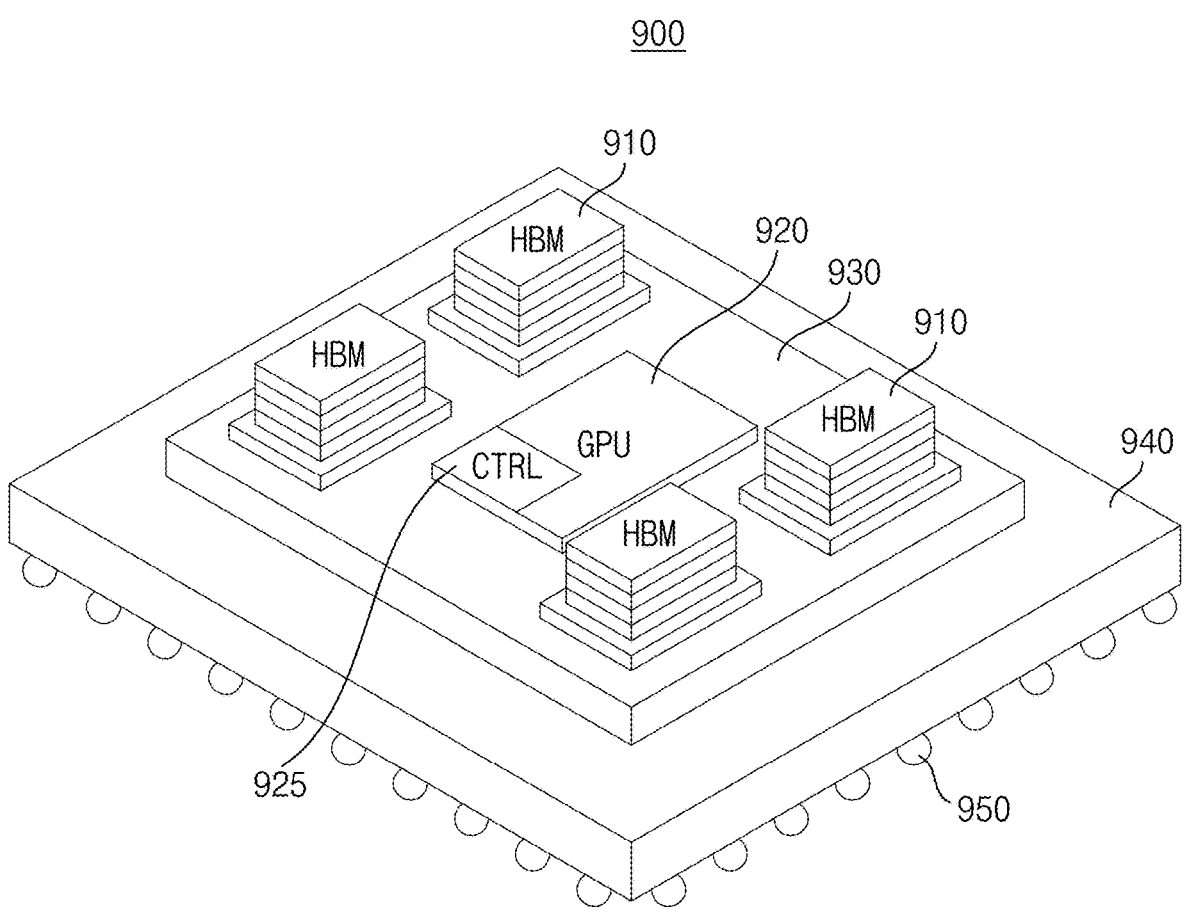
FIG. 31 is a configuration diagram illustrating a semiconductor package including the stacked memory device according to one or more example embodiments.

FIG. 31 is a configuration diagram illustrating a semiconductor package including the stacked memory device according to one or more example embodiments.

Referring to FIG. 31, a semiconductor package 900 may include one or more stacked memory devices 910 and a graphic processing unit (GPU) 920.

The stacked memory devices 910 and the GPU 920 may be mounted on an interposer 930, and the interposer on which the stacked memory device 910 and the GPU 920 are mounted may be mounted on a package substrate 940 mounted on solder balls 950. The GPU 920 may correspond to a semiconductor device which may perform a memory control function, and for example, the GPU 920 may be implemented as an application processor (AP). The GPU 920 may include a memory controller CTRL 925 having a scheduler.

The stacked memory device 910 may be implemented in various forms, and the stacked memory device 910 may be a memory device in a high bandwidth memory (HBM) form in which a plurality of layers are stacked. Accordingly, the stacked memory device 910 may include a buffer die and a plurality of memory dies and each of the plurality of memory dies include an ECS circuit, a refresh control circuit and a row hammer management circuit.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions. Meanwhile, when the stacked memory device 910 includes a direct access region, a test signal may be provided into the stacked memory device 910 through conductive means (e.g., solder balls 950) mounted under package substrate 940 and the direct access region.

Figure 32:
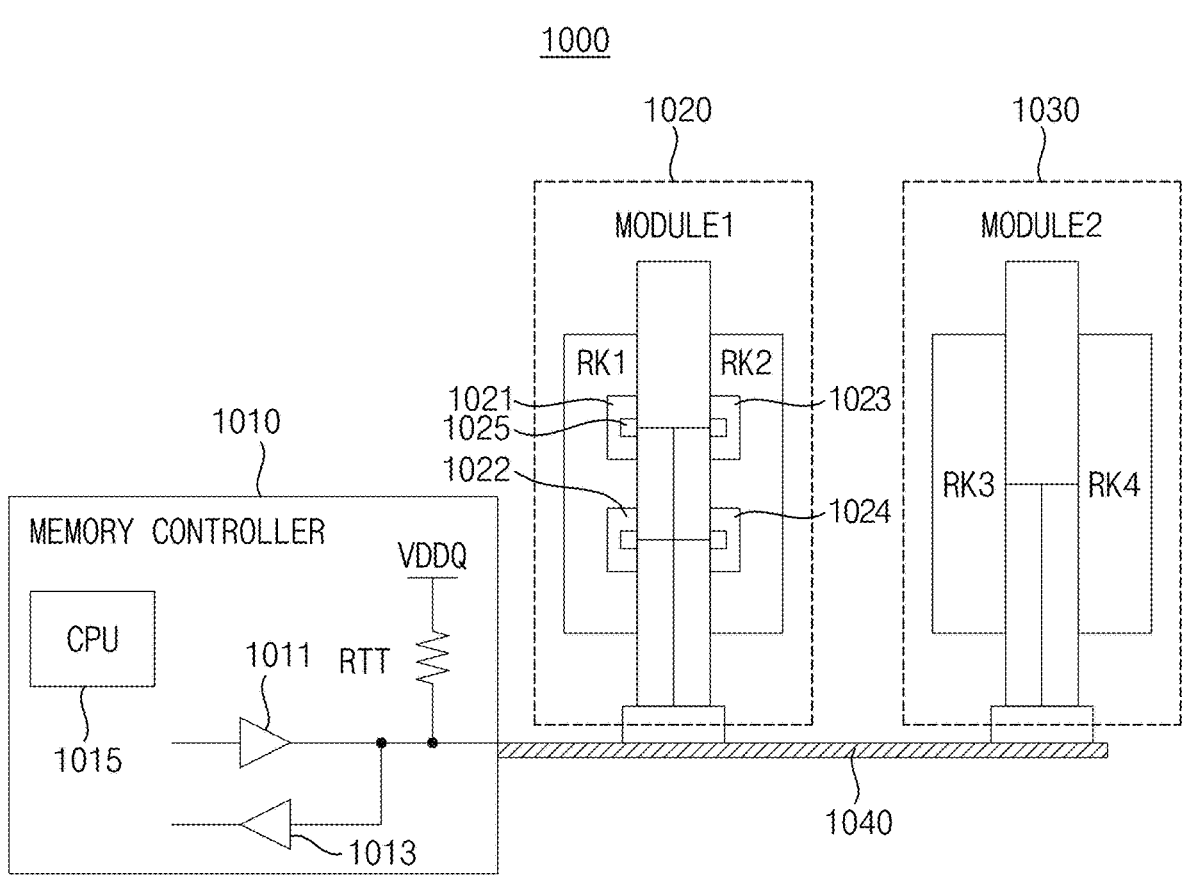
FIG. 32 is a block diagram illustrating a memory system having quad-rank memory modules according to one or more example embodiments.

FIG. 32 is a block diagram illustrating a memory system having quad-rank memory modules according to one or more example embodiments.

Referring to FIG. 32, a memory system 1000 may include a memory controller 1010 and/or memory modules 1020 and 1030. While two memory modules are depicted in FIG. 37, more or fewer memory modules may be included in the memory system 1000, according to one or more example embodiments.

The memory controller 1010 may control a memory module 1020 and/or 1030 so as to perform a command supplied from a processor and/or host. The memory controller 1010 may be implemented using processing circuitry (e.g., a processor) and/or may be implemented with a host, an application processor or a system-on-a-chip (SoC). For signal integrity, a source termination may be implemented with a resistor RTT on a bus 1040 of the memory controller 1010. The resistor RTT may be coupled to a power supply voltage VDDQ. The memory controller 1010 may include a transmitter 1011, which may transmit a signal to at least one of the memory modules 1020 and/or 1030, and a receiver 1013 that may receive a signal from at least one of the memory modules 1020 and/or 1030. The memory controller 1010 may include a CPU 1015.

The memory modules 1020 and 1030 may be referred to as a first memory module 1020 and a second memory module 1030. The first memory module 1020 and the second memory module 1030 may be coupled to the memory controller 1010 through the bus 1040. Each of the first memory module 1020 and the second memory module 1030 may include a plurality of semiconductor memory devices and/or a registered clock driver. The first memory module 1020 may include memory ranks RK1 and RK2, and the second memory module 1030 may include memory ranks RK3 and RK4.

The memory rank RK1 may include semiconductor memory devices 1021 and 1022 and the memory rank RK2 may include semiconductor memory devices 1023 and 1024. Each of the memory ranks RK3 and RK4 may include semiconductor memory devices. Each of the semiconductor memory devices 1021, 1022, 1023 and 1024 may employ the semiconductor memory device 200 of FIG. 3.

Each of the semiconductor memory devices 1021, 1022, 1023 and 1024 may be connected to the memory controller 1010 through an alert pin 1025 and the bus 1040. Each semiconductor memory devices 1021, 1022, 1023 and 1024 may notify the memory controller 1010 of an error state by changing a logic level of an alert signal through the alert pin 1025.

The alert pin 1025 of each of the semiconductor memory devices 1021, 1022, 1023 and 1024 may be commonly connected to the bus 1040. When at least one of the semiconductor memory devices 1021, 1022, 1023 and 1024 changes a logic level of the alter signal, a voltage across the resistor RTT is changed and thus, the CPU 1015 may identify that a situation of a hammer address queue being full occurs in at least one of the semiconductor memory devices 1021, 1022, 1023 and 1024.

Aspects of the present disclosure may be applied to systems using semiconductor memory devices that employ volatile memory cells. For example, aspects may be applied to systems such as be a smart phone, a navigation system, a notebook computer, a desk top computer and a game console that use the semiconductor memory device as a working memory.

The foregoing is illustrative of example embodiments and is not to be construed as limiting thereof. Although example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A semiconductor memory device comprising:
 a memory cell array comprising a plurality of memory cell rows, each of the plurality of memory cell rows comprising a plurality of memory cells;
 an error correction code (ECC) engine configured to perform an ECC decoding on data read from the memory cell array and generate an error generation signal based on the ECC decoding;
 an error check and scrub (ECS) circuit configured to generate scrubbing addresses for performing a scrubbing operation in an ECS mode and output at least one of the scrubbing addresses as an error address based on the error generation signal, wherein the error generation signal corresponds to a detection of a number of error bits in excess of a predetermined threshold;
 a row hammer management circuit configured to:
  in the ECS mode, store an error flag with a first logic level in a portion of count cells to store count data, of each of one or more adjacent memory cell rows which are physically adjacent to a weak memory cell row corresponding to the error address from among the plurality of memory cell rows; and
  in a normal mode, compare counted values indicating a number of times of access associated with each of the plurality of memory cell rows with different reference number of times based on the error flag and output a hammer address designating a first memory cell row, which is intensively accessed, from among the plurality of memory cell rows based on the comparison; and a refresh control circuit configured to receive the hammer address and perform a hammer refresh operation on one or more victim memory cell rows which are physically adjacent to the first memory cell row corresponding to the hammer address.

2. The semiconductor memory device of claim 1, wherein the ECC engine is further configured to, in the ECS mode, perform the scrubbing operation by:

detecting an error bit by performing the ECC decoding on a first data by codeword unit, read from a second memory cell row designated by a first scrubbing address from among the scrubbing addresses;

correcting the detected the error bit; and writing back a corrected codeword in a corresponding memory location of the second memory cell row, and wherein the ECS circuit is further configured to, based on a number of error bits detected in the second memory cell row by unit of the codeword being equal to or greater than a first number, provide the first scrubbing address to the row hammer management circuit as the error address, the first number being a natural number equal to or greater than one.

3. The semiconductor memory device of claim 1, wherein the ECS circuit comprises:

an ECS address counter configured to generate the scrubbing addresses by sequentially increasing or decreasing the scrubbing addresses based on an ECS mode signal;

an error counter configured to generate an error counted value by counting the error generation signal in the ECS mode;

a comparator configured to generate a comparison signal by comparing the error counted value with a reference error number; and an error address generator configured to store respective ones of the scrubbing addresses and selectively output a first scrubbing address as the error address based on the comparison signal.

4. The semiconductor memory device of claim 3, wherein the error address generator is further configured to, based on the comparison signal indicating that the error counted value is equal to or greater than a reference error value, output the first scrubbing address as the error address.

5. The semiconductor memory device of claim 1, wherein the row hammer management circuit is further configured to:

receive the error address in the ECS mode;

sequentially access a first adjacent memory cell row and a second adjacent memory cell row which are physically adjacent to the weak memory cell row corresponding to the error address; and store the error flag with the first logic level in count cells of each of the first adjacent memory cell row and the second adjacent memory cell row.

6. The semiconductor memory device of claim 1, wherein the row hammer management circuit comprises a hammer address queue, and wherein the row hammer management circuit is further configured to, in the normal mode:

based on an active command from an external memory controller, store the counted values in the count cells as the count data;

based on a reference time interval elapsing from receiving the active command, perform an internal read-update-write operation to read the count data and the error flag from the count cells of a target memory cell row from among the plurality of memory cell rows, to update the count data, and to write the updated count data in the count cells of the target memory cell row;

based on the error flag having a second logic level different from the first logic level, selectively store a target access address designating the target memory cell row in the hammer address queue based on comparing the count data with a first reference number of times; and based on the error flag having the first logic level, selectively store the target access address in the hammer address queue based on comparing the count data with a second reference number of times that is smaller than the first reference number of times.

7. The semiconductor memory device of claim 6, wherein the row hammer management circuit is further configured to, based on the error flag having the first logic level and the count data being equal to or greater than the second reference number of times, store the target access address in the hammer address queue as a candidate hammer address.

8. The semiconductor memory device of claim 6, wherein the row hammer management circuit is further configured to, based on the error flag having the first logic level and the count data being equal to or greater than the second reference number of times, provide the target access address to the refresh control circuit as the hammer address.

9. The semiconductor memory device of claim 6, wherein the row hammer management circuit further comprises:

an adder configured to update a count data read from the count cells of the target memory cell row to output the count data;

a second comparator configured to compare the count data with a selected reference number of times to output a second comparison signal;

a multiplexer configured to provide the second comparator with one of the first reference number of times and the second reference number of times as the selected reference number of times based on error flags read from the count cells;

an adjacent address generator configured to receive the error address in the ECS mode and generate a first adjacent address and a second adjacent address based on the error address; and an error flag control circuit configured to sequentially access a first adjacent memory cell row and a second adjacent memory cell row which are physically adjacent to the weak memory cell row based on the first adjacent address and the second adjacent address, and store the error flag with the first logic level in the count cells of each of the first adjacent memory cell row and the second adjacent memory cell row.

10. The semiconductor memory device of claim 9, wherein the multiplexer is further configured to:

based on the error flag having the first logic level, output the first reference number of times as the selected reference number of times; and based on the error flag having the second logic level, output the second reference number of times as the selected reference number of times.

11. The semiconductor memory device of claim 9, wherein the row hammer management circuit further comprises:

a first demultiplexer configured to selectively output the target access address based on the second comparison signal; and a second demultiplexer configured to store an output of the first demultiplexer in the hammer address queue as a candidate hammer address or provide the output of the first demultiplexer to the refresh control circuit as the hammer address based on a mode signal designating one of an urgent mode and a non-urgent mode.

12. The semiconductor memory device of claim 11, wherein the first demultiplexer is further configured to, based on the second comparison signal indicating that the count data is equal to or greater than the selected reference number of times, provide the target access address to the second demultiplexer.

13. The semiconductor memory device of claim 11, wherein the second demultiplexer is further configured to:

based on the mode signal designating the urgent mode, output the target access address as the hammer address; and the mode signal designating the non-urgent mode, store the target access address in the hammer address queue.

14. The semiconductor memory device of claim 6, wherein the hammer address queue comprises:

a plurality of registers configured to store candidate hammer addresses, a number of the plurality of registers corresponding to a first number; and a monitor logic connected to the plurality of registers and configured to:

manage the plurality of registers;

monitor a number of candidate hammer addresses stored in the plurality of registers; and based on the number of the candidate hammer addresses stored in the plurality of registers reaching a second number:

output one of the candidate hammer addresses as the hammer address, and based on outputting the hammer address, transit an alert signal, provided to a memory controller, from the second logic level to the first logic level different from the second logic level.

15. The semiconductor memory device of claim 1, wherein the refresh control circuit comprises:

a refresh control logic configured to generate a hammer refresh signal based on a refresh management signal which is based on a refresh management command provided from a memory controller in response to a transition of an alert signal;

a refresh clock generator configured to, based on a refresh control signal, generate a refresh clock signal;

a refresh counter configured to generate a count refresh address associated with a normal refresh operation on the plurality of memory cell rows;

a hammer address storage configured to store the hammer address and configured to output the hammer address based on the hammer refresh signal; and a mapper configured to generate hammer refresh addresses designating addresses of the one or more victim memory cell rows based on the hammer address.

16. The semiconductor memory device of claim 1, further comprising:

a control logic circuit configured to control the ECS circuit, the row hammer management circuit and the ECC engine, wherein the ECC engine is further configured to:

perform a first ECC encoding operation on the data to be stored in normal cells in each of the of the plurality of memory cell rows to generate a parity data, and perform a second ECC encoding operation on the count data to generate a count parity data, wherein the memory cell array comprises:

a normal cell region that include the normal cells to store the data and count cells to store the count data, and a parity cell region to store the parity data and the count parity data, wherein the normal cell region includes a plurality of sub array blocks arranged in a first direction and a second direction crossing the first direction, each of the plurality of sub array blocks comprising volatile memory cells, and wherein a portion of the plurality of sub array blocks comprises the count cells.

17. A memory system comprising:

a semiconductor memory device; and a memory controller configured to control the semiconductor memory device, wherein the semiconductor memory device comprises:

a memory cell array comprising a plurality of memory cell rows, each of the plurality of memory cell rows comprising a plurality of memory cells;

an error correction code (ECC) engine configured to perform an ECC decoding on data read from the memory cell array and generate an error generation signal based on the ECC decoding;

an error check and scrub (ECS) circuit configured to generate scrubbing addresses for performing a scrubbing operation in an ECS mode and output at least one of the scrubbing addresses as an error address based on the error generation signal, wherein the error generation signal corresponds to a detection of a number of error bits in excess of a predetermined threshold;

a row hammer management circuit configured to:

in the ECS mode, store an error flag with a first logic level in a portion of count cells to store count data, of each of one or more adjacent memory cell rows which are physically adjacent to a weak memory cell row corresponding to the error address from among the plurality of memory cell rows; and in a normal mode, compare counted values indicating a number of times of access associated with each of the plurality of memory cell rows with different reference number of times based on a logic level of the error flag and output a hammer address designating a first memory cell row, which is intensively accessed, from among the plurality of memory cell rows based on the comparison; and a refresh control circuit configured to receive the hammer address and perform a hammer refresh operation on one or more victim memory cell rows which are physically adjacent to the first memory cell row corresponding to the hammer address.

18. The memory system of claim 17, wherein the row hammer management circuit is further configured to:

receive the error address in the ECS mode;

sequentially access a first adjacent memory cell row and a second adjacent memory cell row which are physically adjacent to the weak memory cell row corresponding to the error address; and store the error flag with the first logic level in count cells of each of the first adjacent memory cell row and the second adjacent memory cell row.

19. The memory system of claim 17, wherein the row hammer management circuit comprises a hammer address queue, and wherein the row hammer management circuit is further configured to, in the normal mode:

store the counted values in count cells as the count data in response to an active command from the memory controller;

based on a reference time interval elapsing from receiving the active command, perform an internal read-update-write operation to read the count data and the error flag from the count cells of a target memory cell row from among the plurality of memory cell rows, to update the count data, and to write the count data in the count cells of the target memory cell row;

based on the error flag having a second logic level different from the first logic level, selectively store a target access address designating the target memory cell row in the hammer address queue based on comparing the count data with a first reference number of times; and based on the error flag having the first logic level, selectively store the target access address in the hammer address queue based on comparing the count data with a second reference number of times that is smaller than the first reference number of times.

20. A semiconductor memory device comprising:

a memory cell array comprising a plurality of memory cell rows, each comprising a plurality of memory cells;

an error correction code (ECC) engine configured to perform an ECC decoding on data read from the memory cell array and generate an error generation signal based on the ECC decoding, wherein the error generation signal corresponds to a detection of a number of error bits in excess of a predetermined threshold;

an error check and scrub (ECS) circuit configured to generate scrubbing addresses for performing a scrubbing operation in an ECS mode and output at least one of the scrubbing addresses as an error address based on the error generation signal;

a row hammer management circuit configured to:

in the ECS mode, store an error flag with a first logic level in a portion of count cells to store count data, of each of one or more adjacent memory cell rows which are physically adjacent to a weak memory cell row corresponding to the error address from among the plurality of memory cell rows, and in a normal mode, compare counted values indicating a number of times of access associated with each of the plurality of memory cell rows with different reference number of times based on a logic level of the error flag and output a hammer address designating a memory cell row, which is intensively accessed, from among the plurality of memory cell rows based on the comparison; and a refresh control circuit configured to receive the hammer address and perform a hammer refresh operation on one or more victim memory cell rows which are physically adjacent to the memory cell row corresponding to the hammer address, wherein the row hammer management circuit is further configured to:

receive the error address in the ECS mode, sequentially access a first adjacent memory cell row and a second adjacent memory cell row which are physically adjacent to the weak memory cell row corresponding to the error address, and store the error flag with the first logic level in respective count cells of each of the first adjacent memory cell row and the second adjacent memory cell row.

* * * * *